Figure 1:
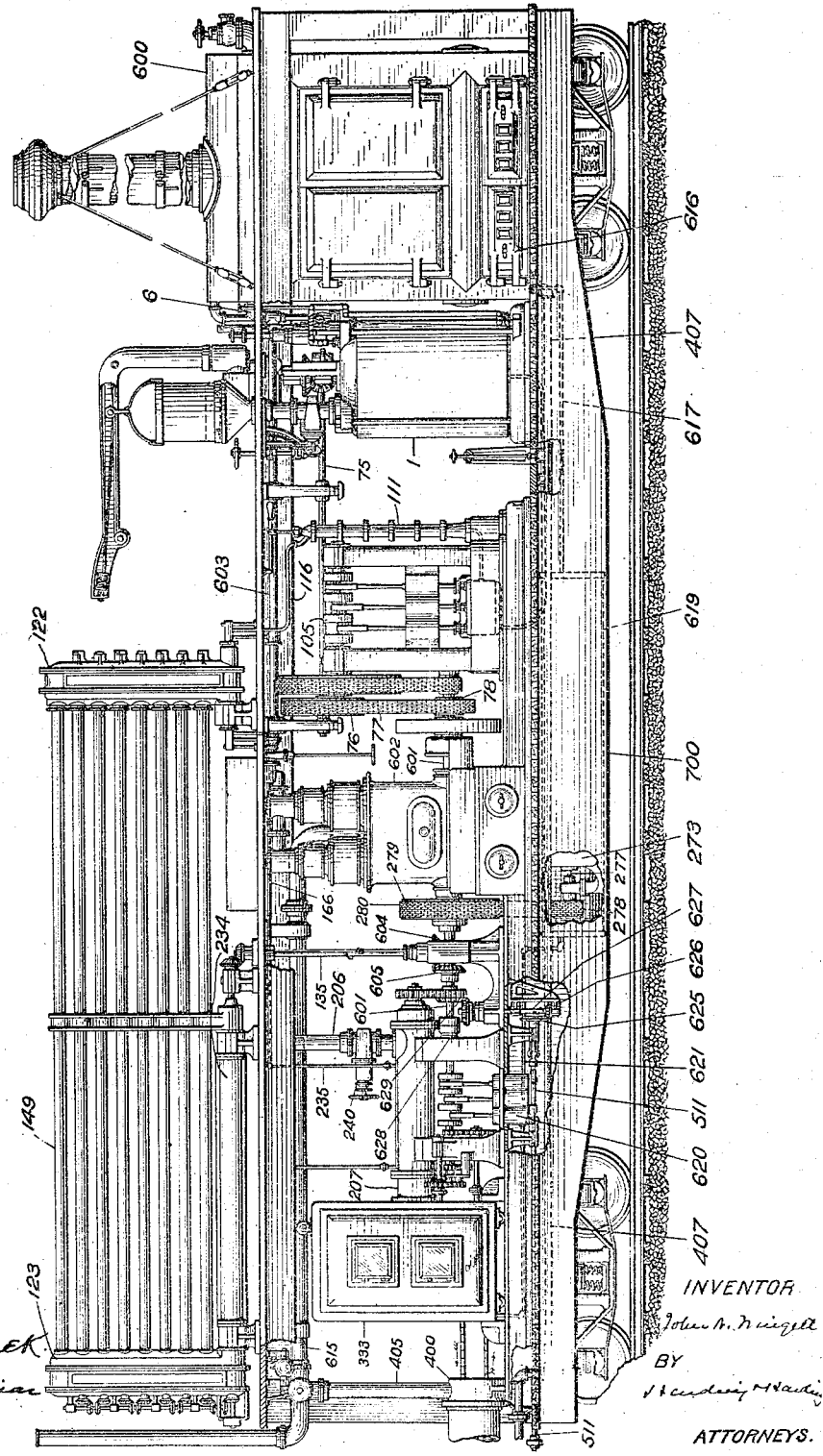

J. N. WINGETT.
PROCESS OF MAKING EXPLOSIVE POWDER.
APPLICATION FILED MAR. 25, 1907.

1,166,731.

Patented Jan. 4, 1916.
28 SHEETS—SHEET 1.

WITNESSES:

INVENTOR
BY
ATTORNEYS.

J. N. WINGETT.
PROCESS OF MAKING EXPLOSIVE POWDER.
APPLICATION FILED MAR. 25, 1907.

1,166,731.

Patented Jan. 4, 1916
28 SHEETS—SHEET 2.

WITNESSES:

INVENTOR:
John N. Wingett
BY
ATTORNEYS.

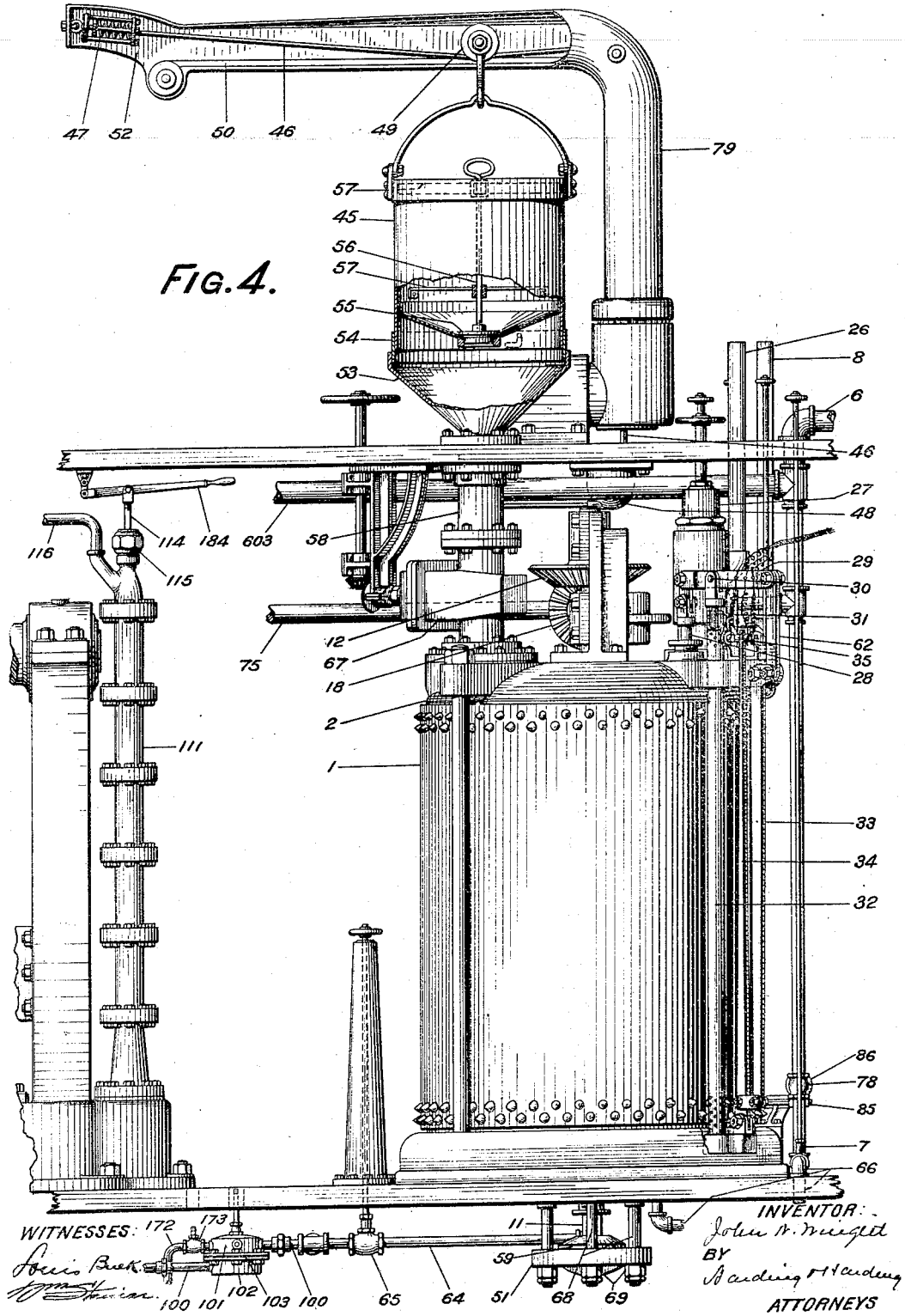

J. N. WINGETT.
PROCESS OF MAKING EXPLOSIVE POWDER.
APPLICATION FILED MAR. 25, 1907.

1,166,731.

Patented Jan. 4, 1916.
28 SHEETS—SHEET 4.

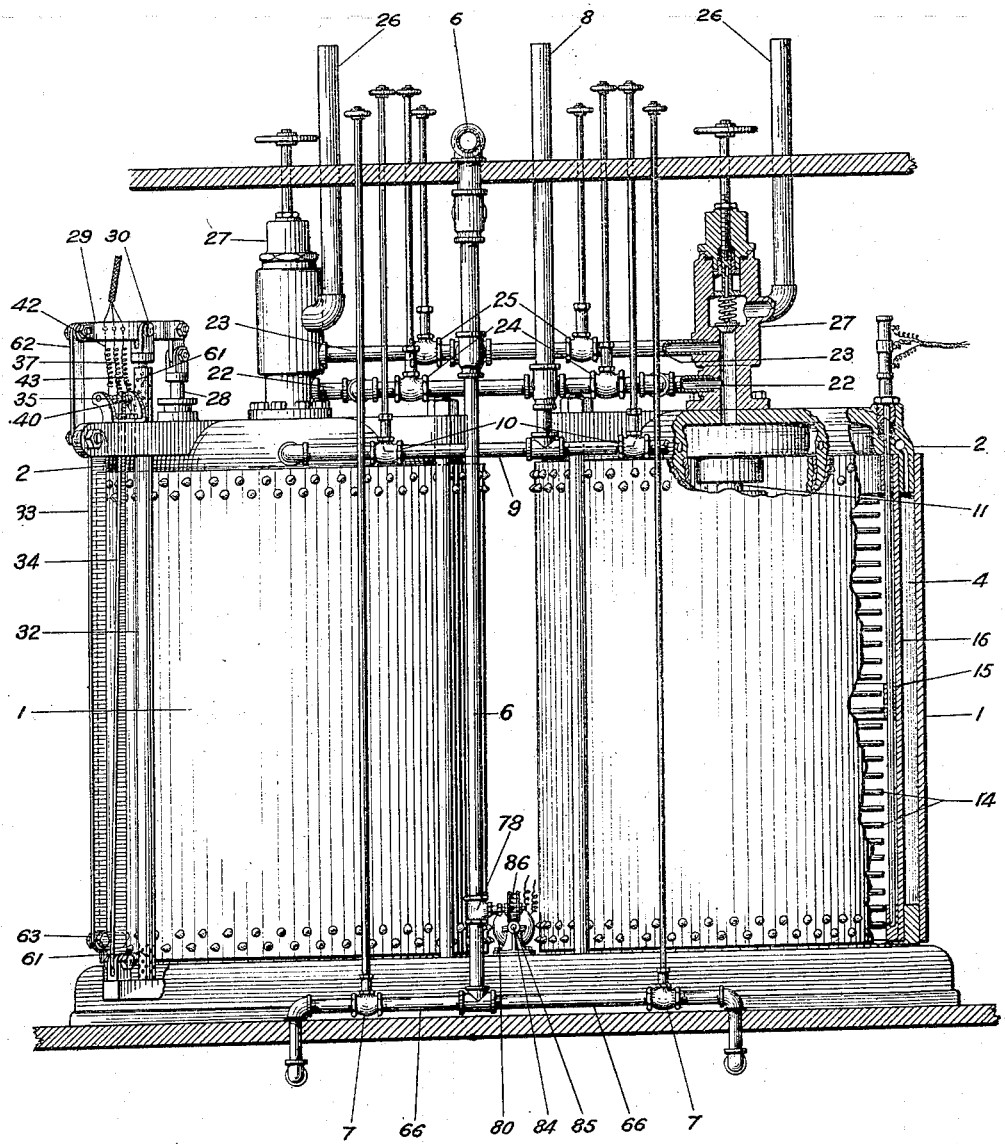

J. N. WINGETT.
PROCESS OF MAKING EXPLOSIVE POWDER.
APPLICATION FILED MAR. 25, 1907.

1,166,731.

Patented Jan. 4, 1916.
28 SHEETS—SHEET 6.

WITNESSES:

INVENTOR

BY

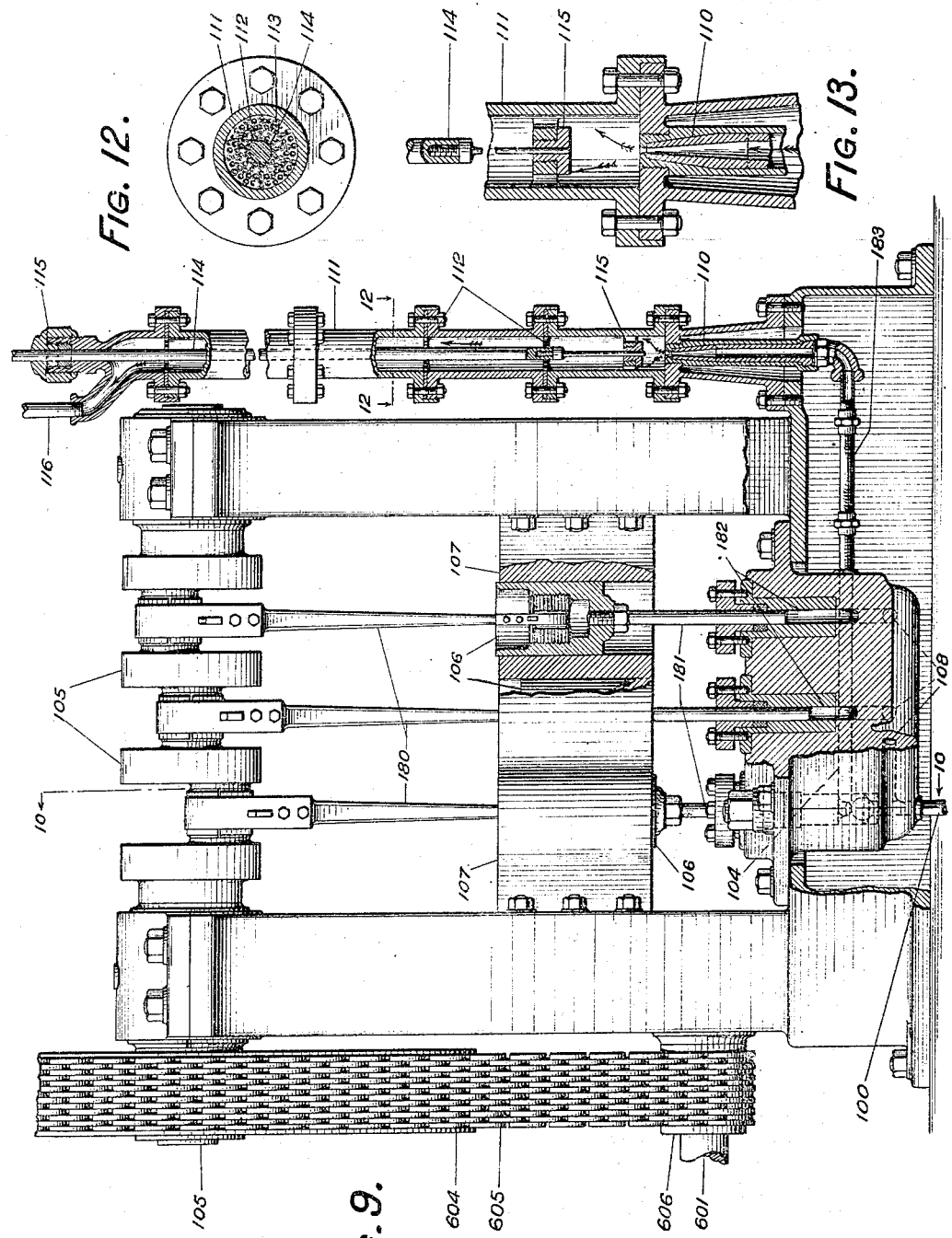

J. N. WINGETT.
PROCESS OF MAKING EXPLOSIVE POWDER.
APPLICATION FILED MAR. 25, 1907.
1,166,731.
Patented Jan. 4, 1916.
28 SHEETS—SHEET 8.
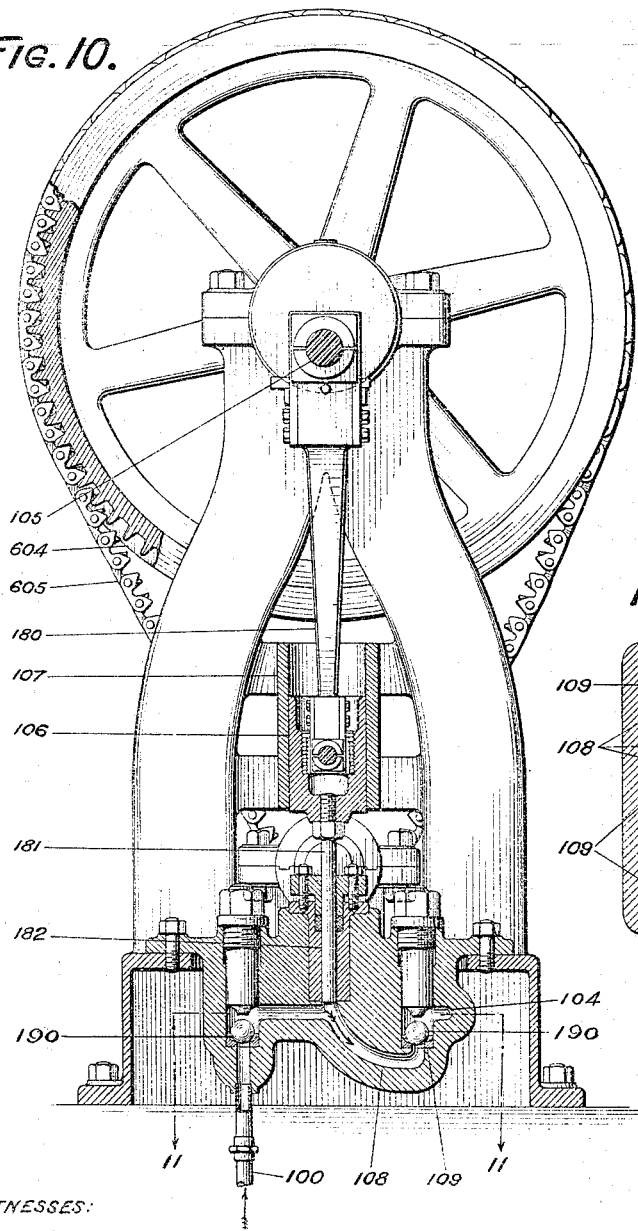
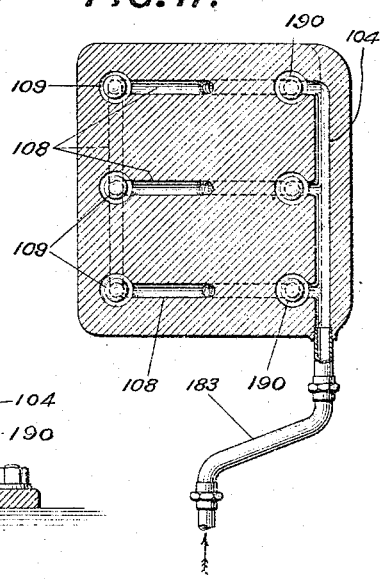

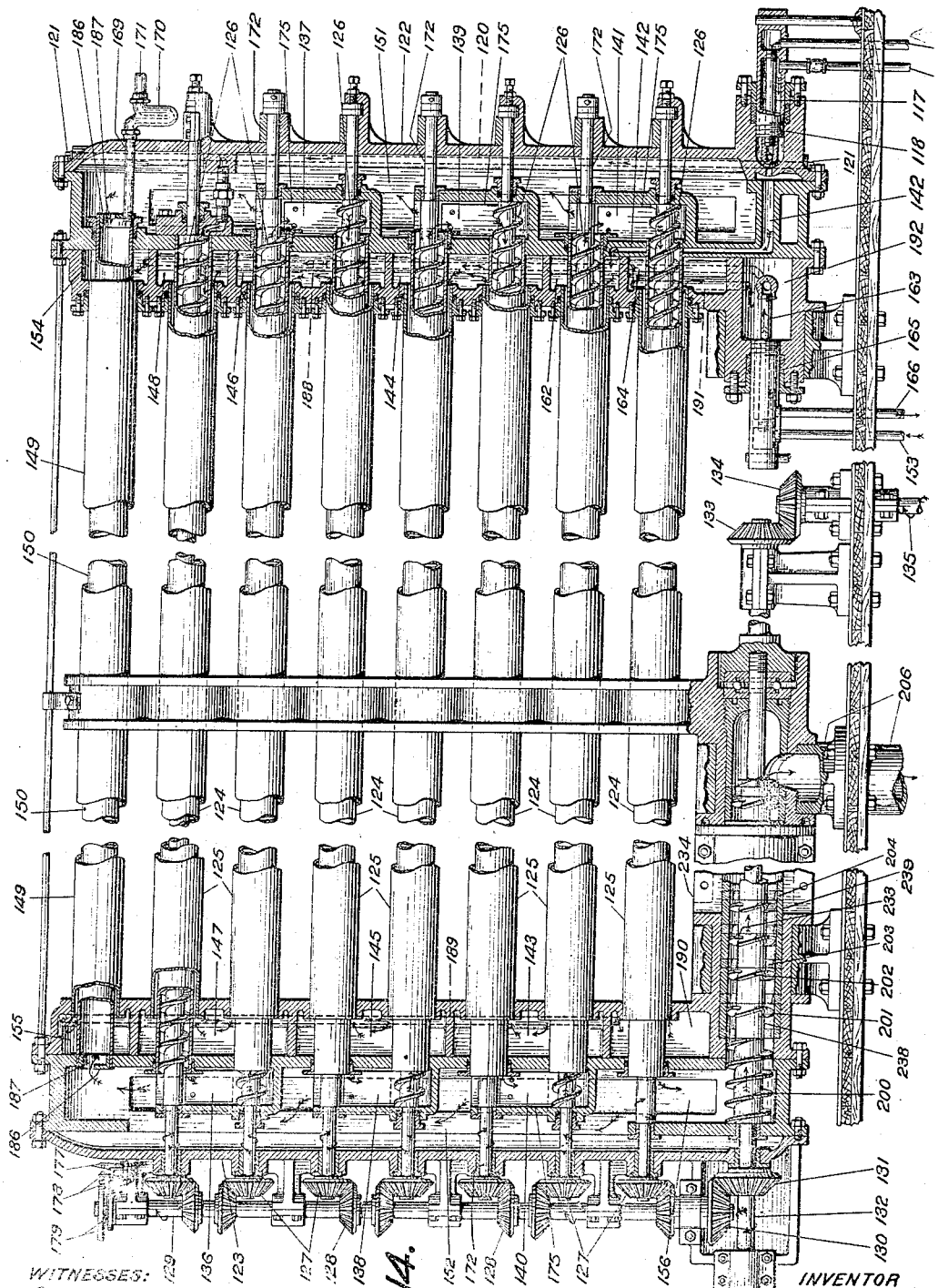

J. N. WINGETT.
PROCESS OF MAKING EXPLOSIVE POWDER.
APPLICATION FILED MAR. 25, 1907.
1,166,731.
Patented Jan. 4, 1916.
28 SHEETS—SHEET 10.
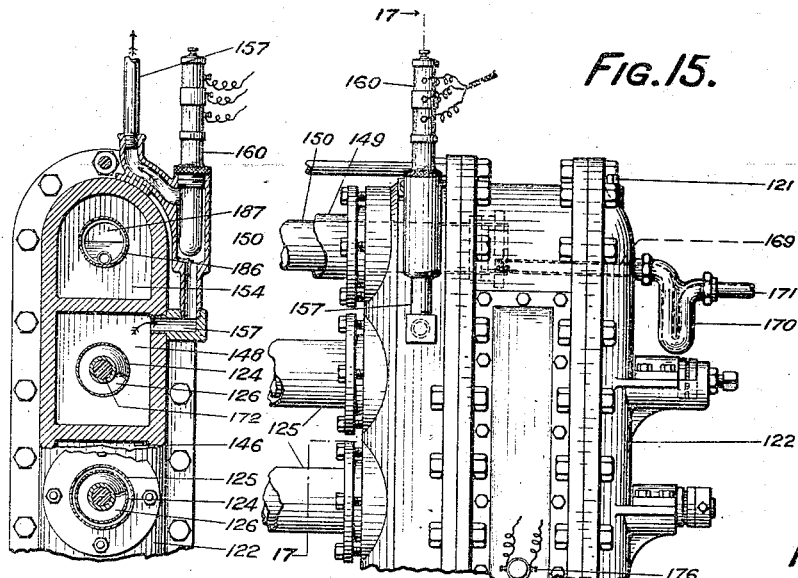
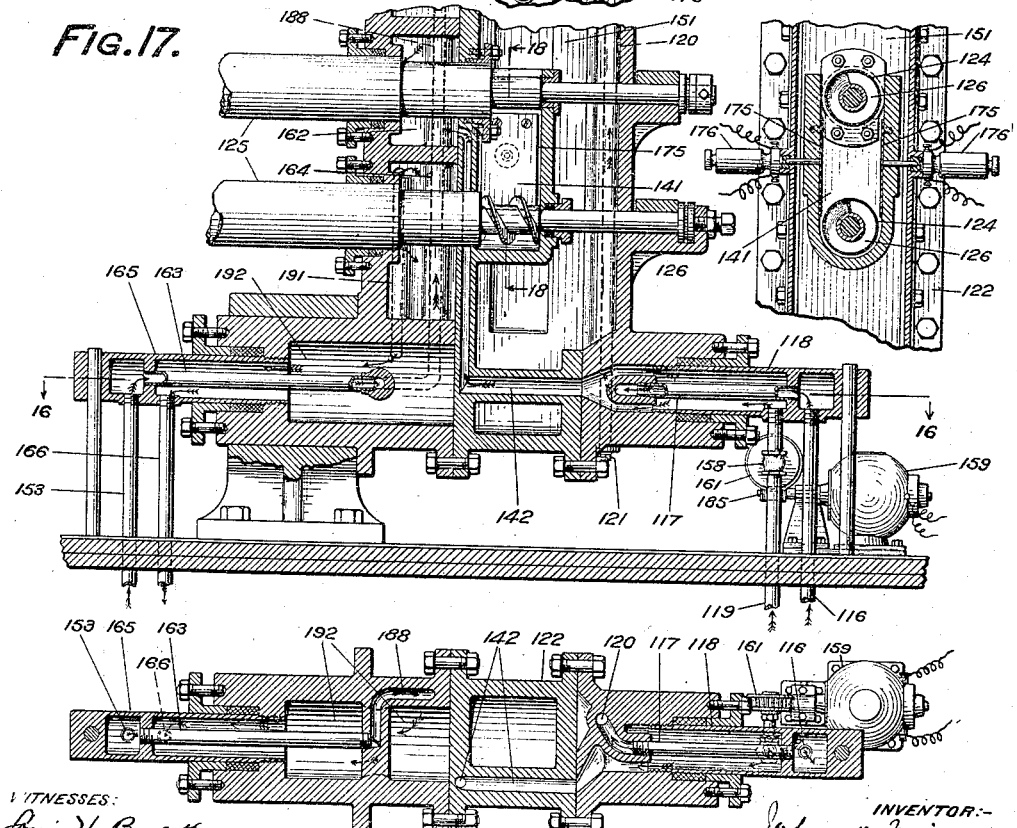

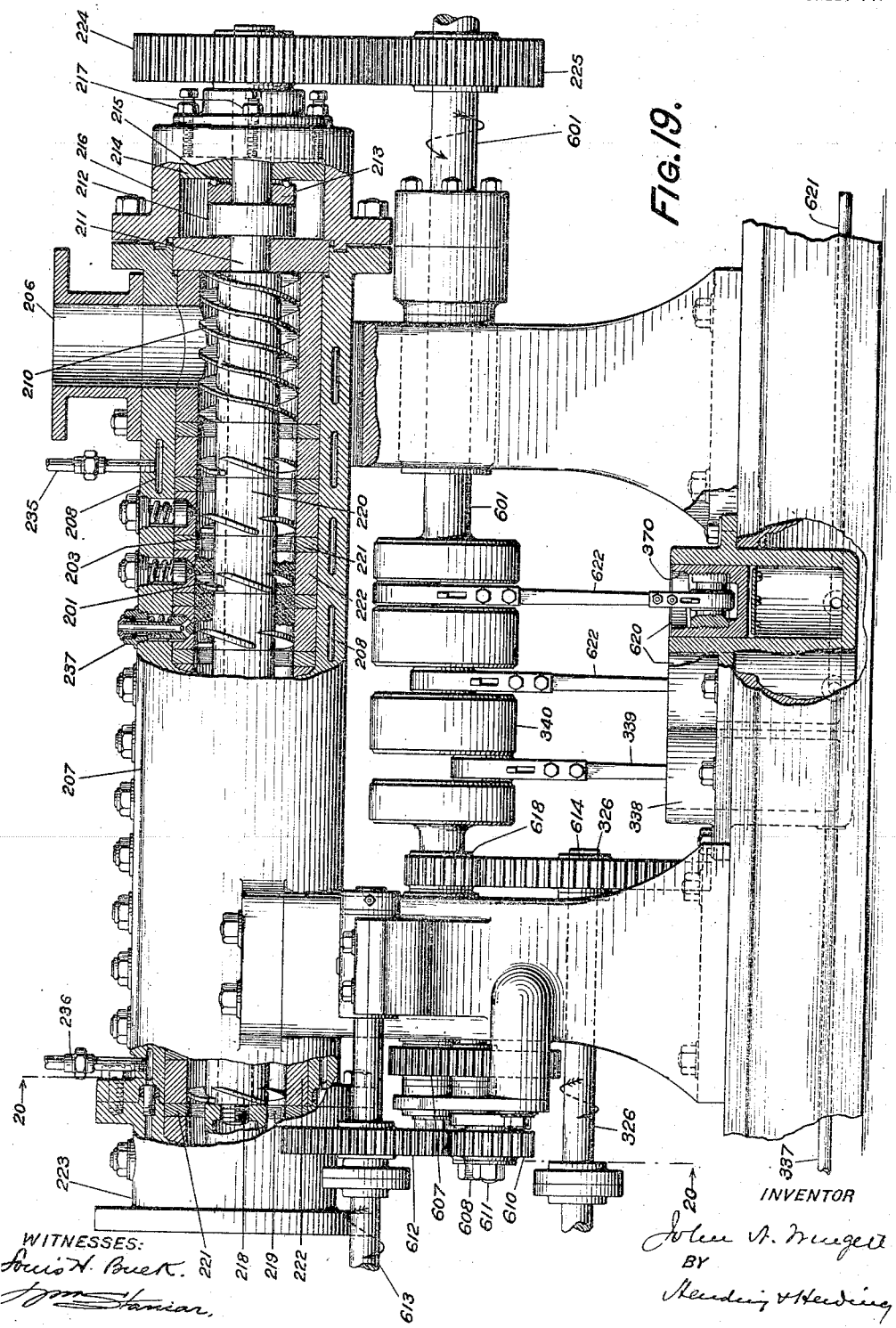

J. N. WINGETT.
PROCESS OF MAKING EXPLOSIVE POWDER.
APPLICATION FILED MAR. 25, 1907.

1,166,731.

Patented Jan. 4, 1916.
28 SHEETS—SHEET 12

J. N. WINGETT.
PROCESS OF MAKING EXPLOSIVE POWDER.
APPLICATION FILED MAR. 25, 1907.

1,166,731.

Patented Jan. 4, 1916.
28 SHEETS—SHEET 13.

WITNESSES:—

INVENTOR:
BY
ATTORNEYS.

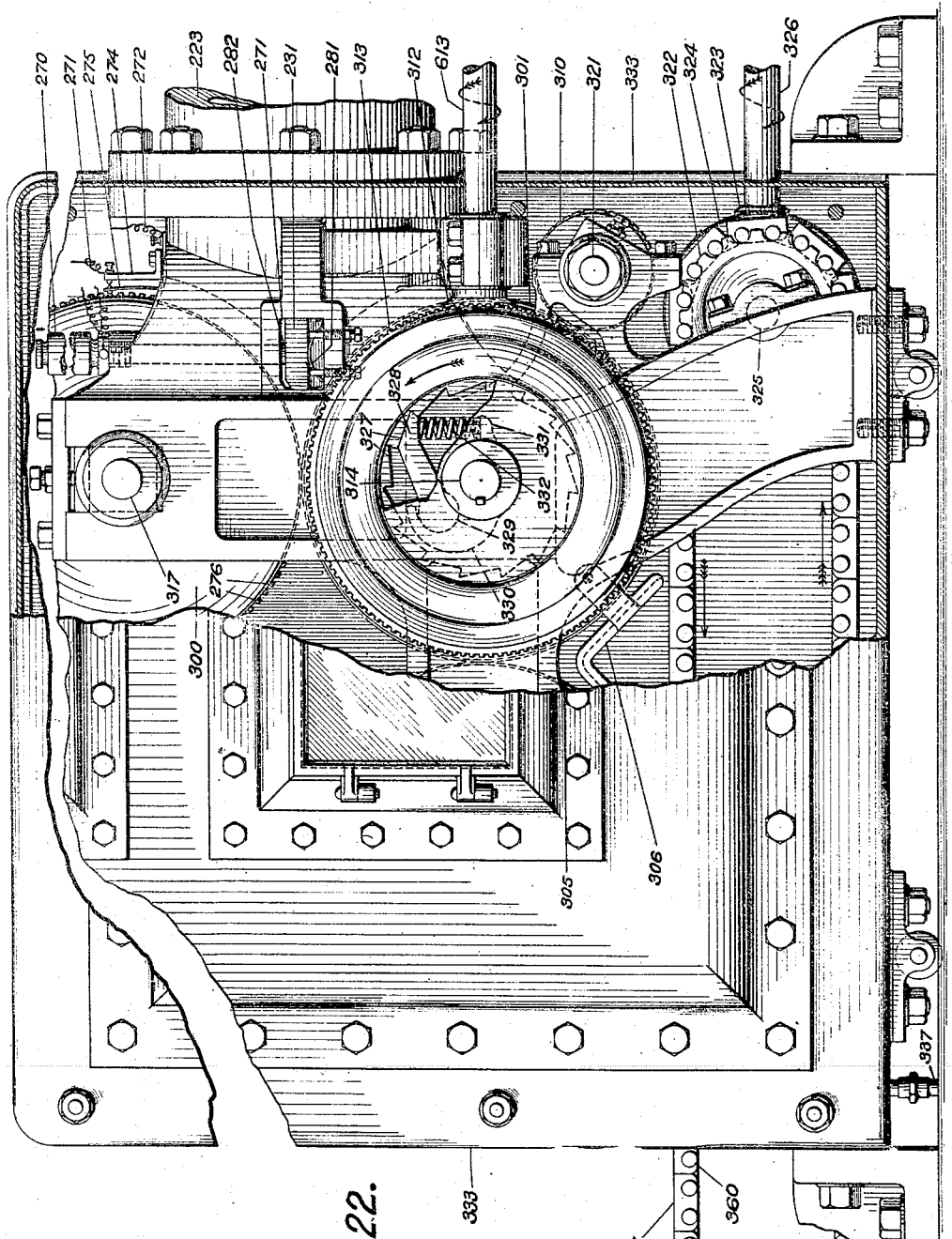

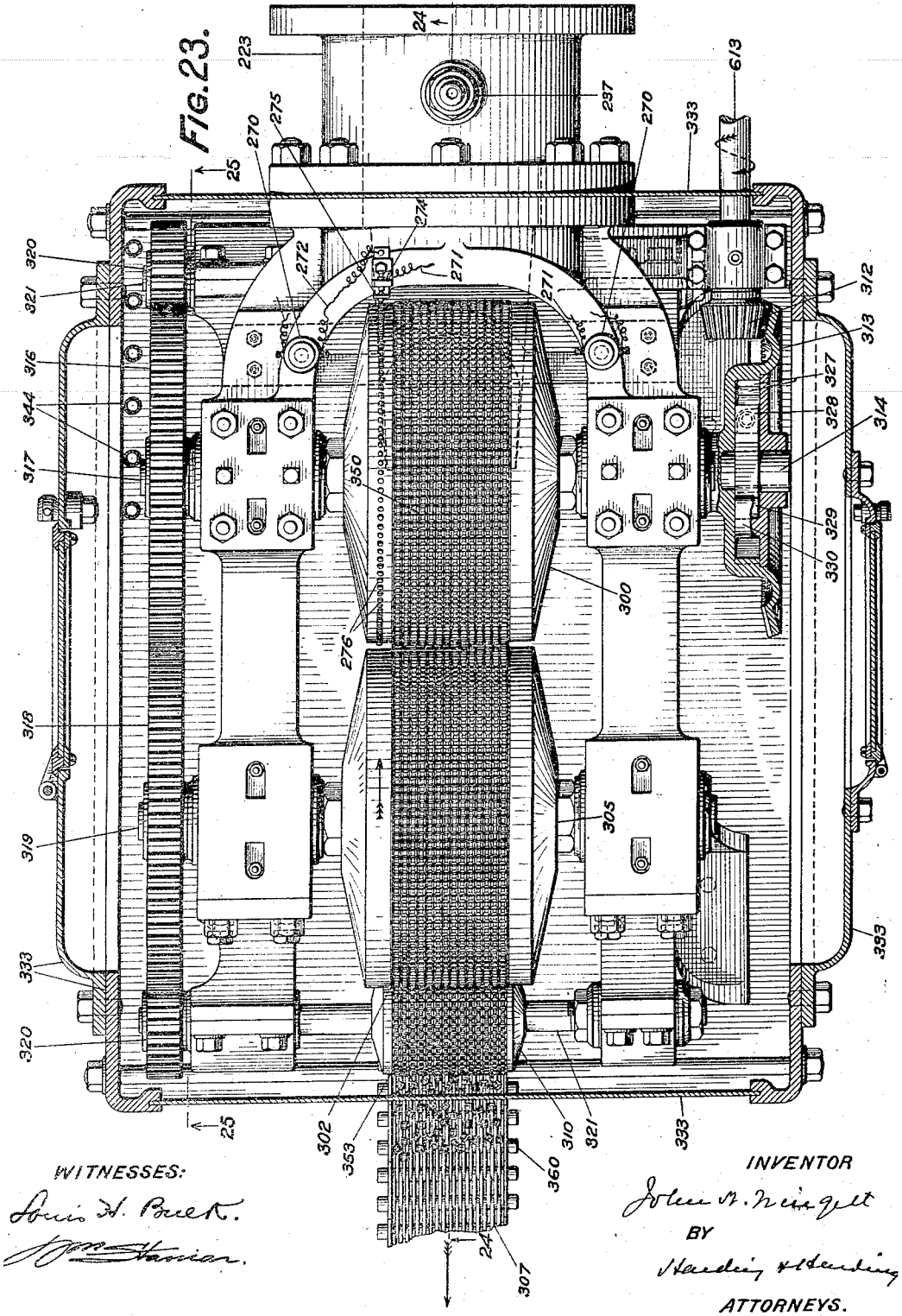

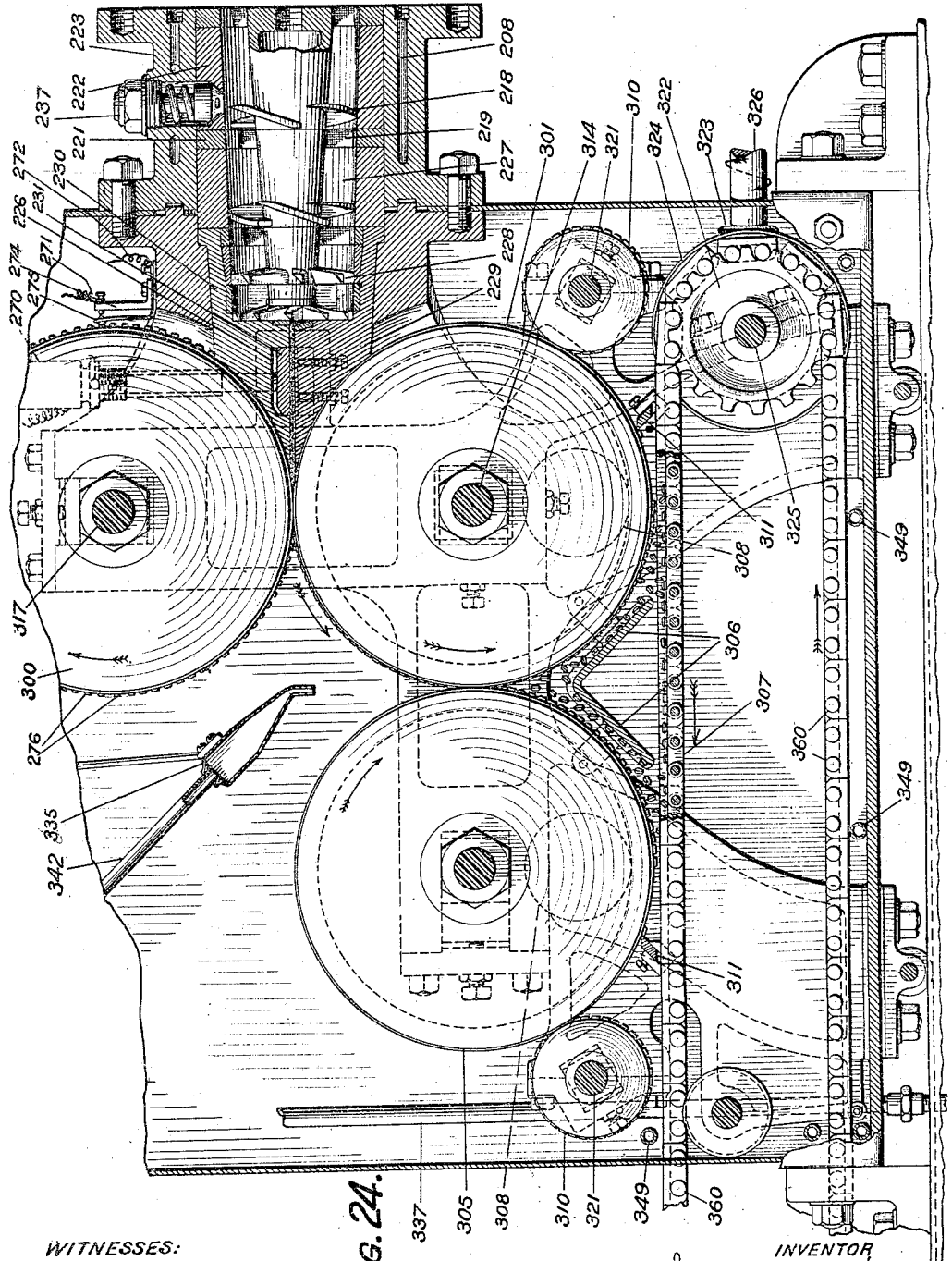

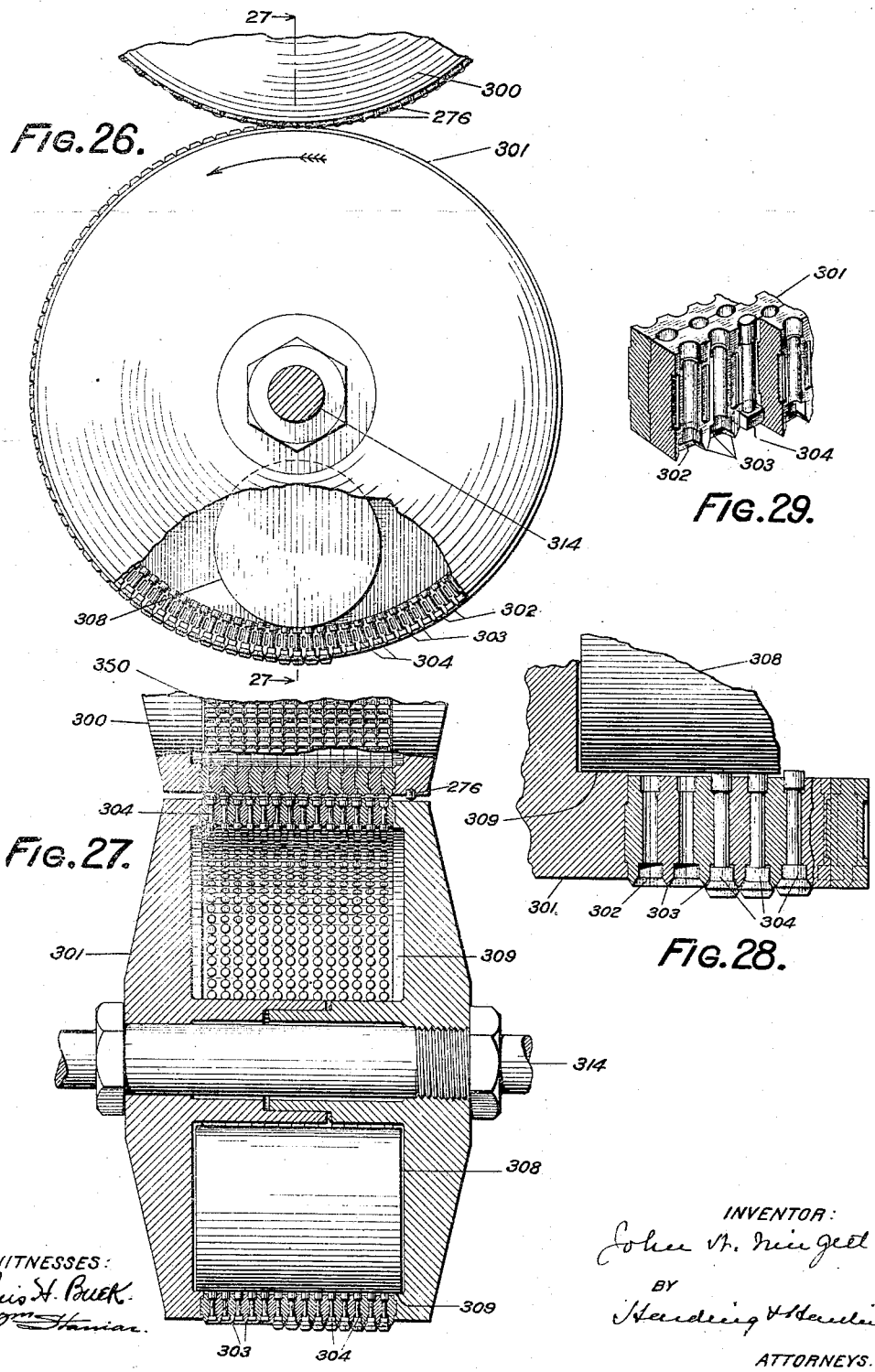

J. N. WINGETT.
PROCESS OF MAKING EXPLOSIVE POWDER.
APPLICATION FILED MAR. 25, 1907.

1,166,731.

Patented Jan. 4, 1916.
28 SHEETS—SHEET 19.

WITNESSES:

INVENTOR:
BY
ATTORNEYS.

J. N. WINGETT.
PROCESS OF MAKING EXPLOSIVE POWDER.
APPLICATION FILED MAR. 25, 1907.

1,166,731. Patented Jan. 4, 1916.
28 SHEETS—SHEET 20.

WITNESSES: INVENTOR:
BY
ATTORNEYS.

J. N. WINGETT.
PROCESS OF MAKING EXPLOSIVE POWDER
APPLICATION FILED MAR. 25, 1907.

1,166,731.

Patented Jan. 4, 1916.
28 SHEETS—SHEET 21.

WITNESSES:

INVENTOR:
BY
ATTORNEYS.

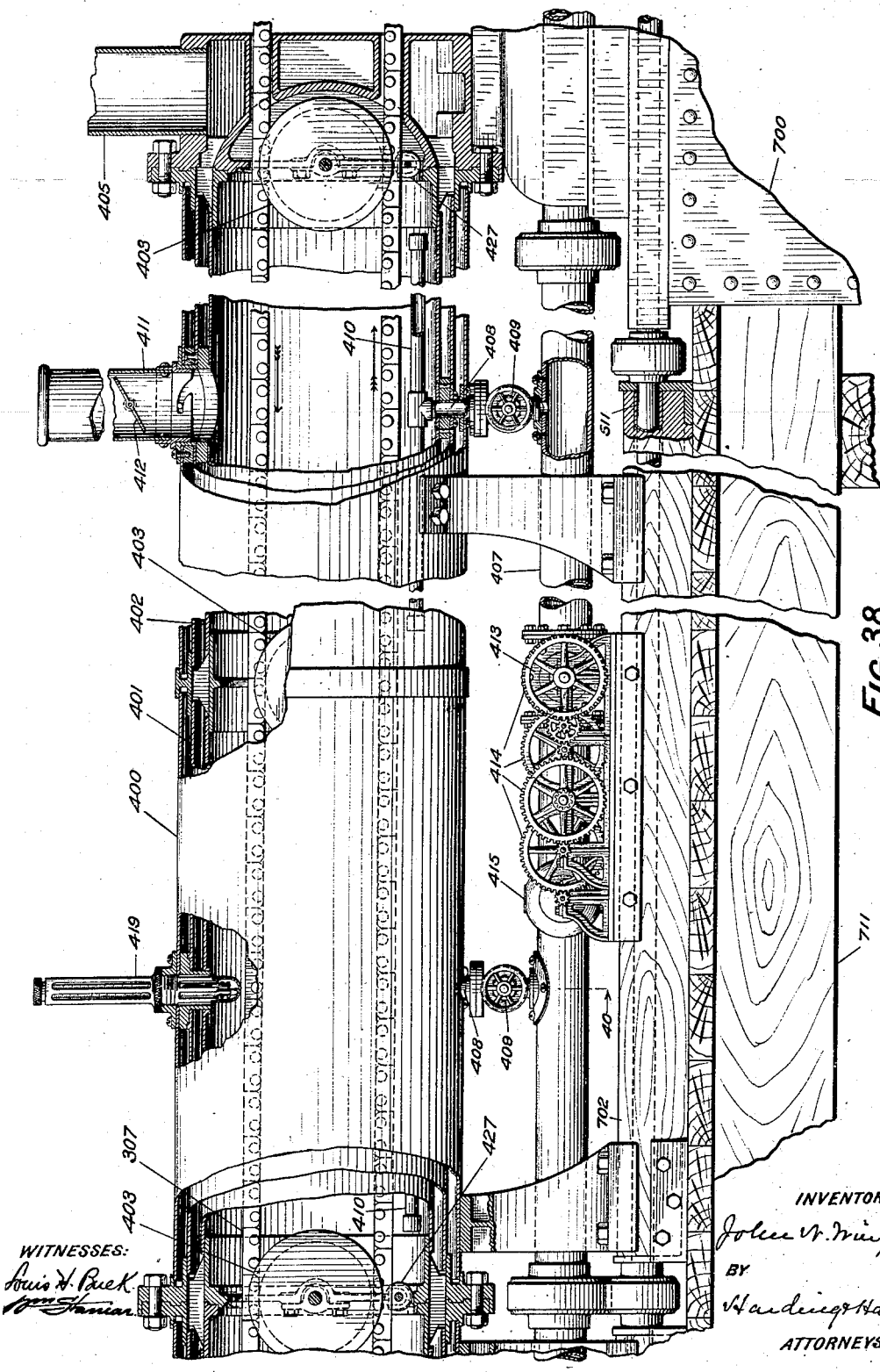

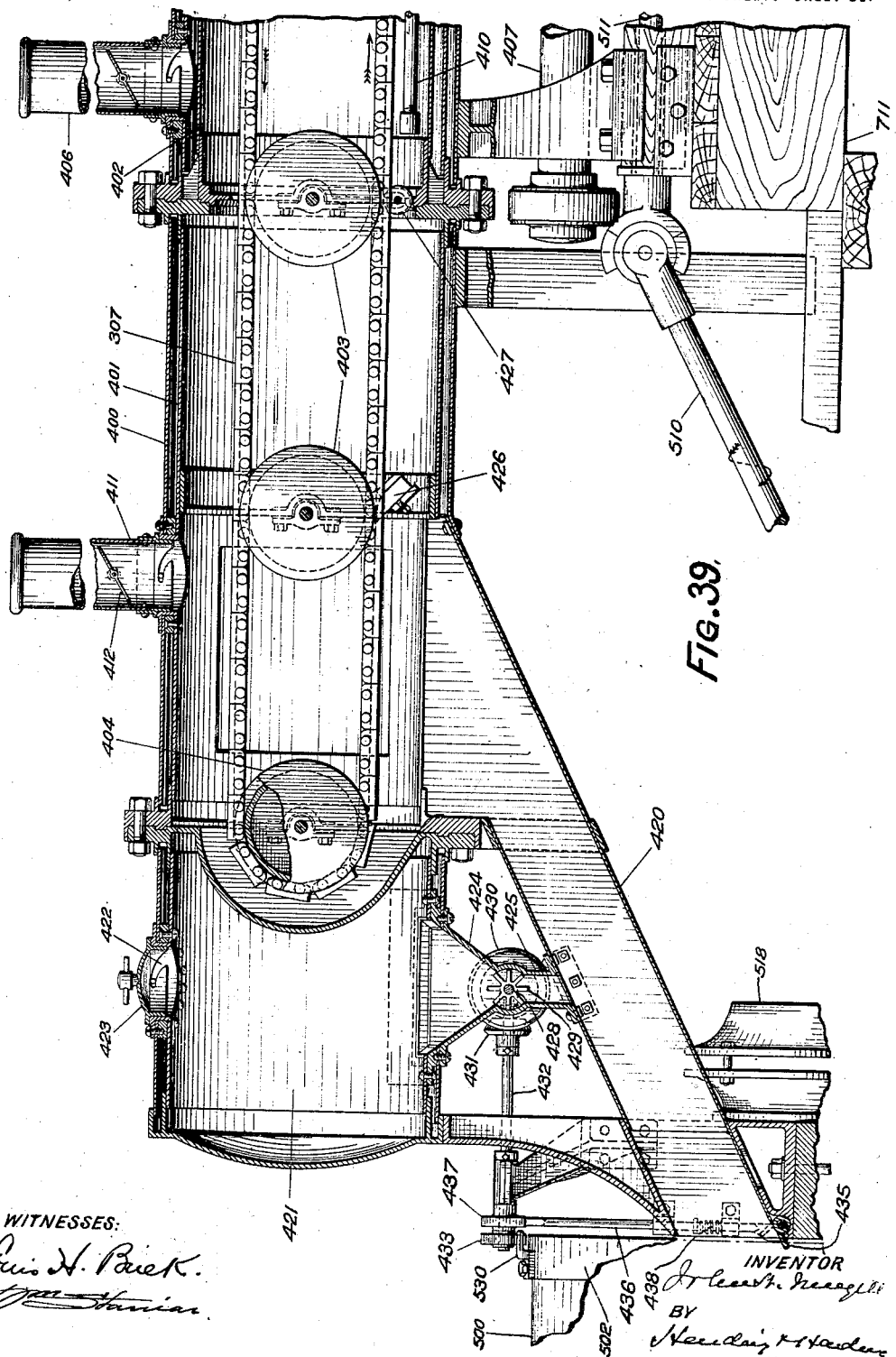

J. N. WINGETT.
PROCESS OF MAKING EXPLOSIVE POWDER.
APPLICATION FILED MAR. 25, 1907.
1,166,731. Patented Jan. 4, 1916.
28 SHEETS—SHEET 25.
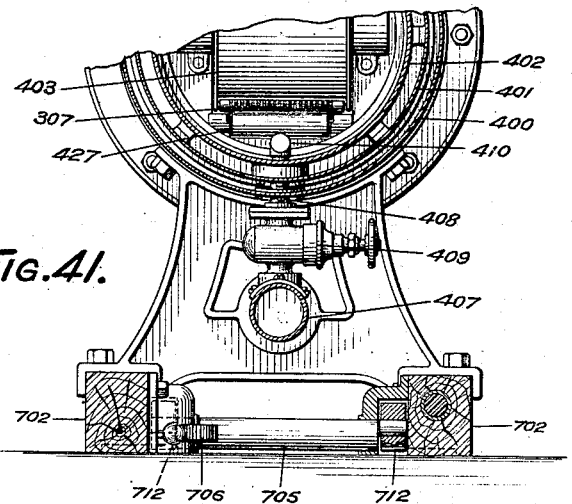
Fig.41.
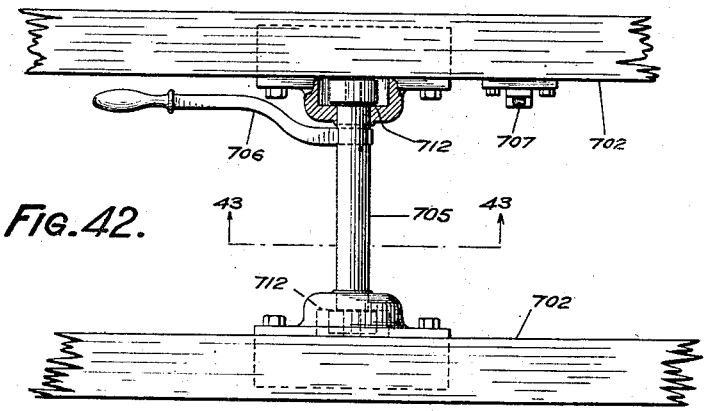
Fig.42.
Fig.43.
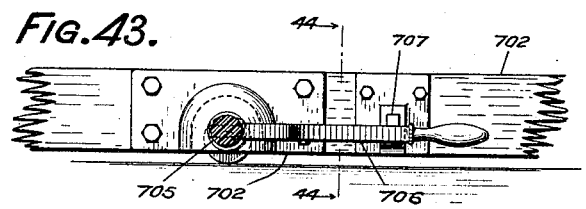
Fig.44.
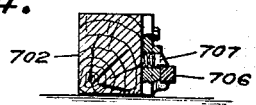
WITNESSES:
INVENTOR:
John N. Wingett
BY
Henning & Henning
ATTORNEYS.

J. N. WINGETT.
PROCESS OF MAKING EXPLOSIVE POWDER.
APPLICATION FILED MAR. 25, 1907.

1,166,731.

Patented Jan. 4, 1916.
28 SHEETS—SHEET 27.

WITNESSES:

INVENTOR:
John N. Wingett
BY
Harding & Harding
ATTORNEYS.

UNITED STATES PATENT OFFICE.

JOHN N. WINGETT, OF WILMINGTON, DELAWARE.

PROCESS OF MAKING EXPLOSIVE POWDER.

1,166,731.   Specification of Letters Patent.   Patented Jan. 4, 1916.

Application filed March 25, 1907. Serial No. 364,411.

*To all whom it may concern:*

Be it known that I, JOHN N. WINGETT, a citizen of the United States, residing at Wilmington, county of New Castle, and State of Delaware, have invented a new and useful Improvement in Processes of Making Explosive Powder, of which the following is a full, clear, and exact description, reference being had to the accompanying drawings, which form a part of this specification.

While my method and machine are particularly designed to manufacture what is known as black powder, the method may be used and many parts of the same may be used in the manufacture of explosive powders of other varieties, such, for instance, as smokeless powder. In like manner the apparatus or parts of the same may be used for the manufacture of all varieties of explosive powders.

Speaking generally, my object is to produce, and the result obtained by my method and apparatus is the production of an improved explosive powder, an explosive powder in which the ingredients are in intimate admixture with each other and practically amorphous and a powder which can be cut or formed into grains. The result which is produced by my apparatus is the carrying into effect such method.

My invention results also in the production of an apparatus which may be readily transported, and means by which it may be transported, in conjunction with, the known means of transportation, cars, boats, vessels or the like. By this latter the explosive may be manufactured at the point of locality where it is desired to be used, thus readily enabling operating, temporarily at any point, a powder producing machine.

Further, it avoids all danger of transportation of the explosive.

Further, by my method I manufacture the powder from the first compounding to the finished grain continuously.

I further act, at any one time, upon small increments, thus reducing the danger of manufacture.

I further am enabled to vary the character of the powder formed.

Speaking generally of my method, I compound the ingredients dissolved more or less in a solvent and during said compounding, apply heat. I thus obtain a most intimate mixture of the ingredients. By varying the heat during this compounding, I have discovered that I can vary the explosive characteristics of the produced powder. I therefore maintain such temperature during incorporation, as will produce the desired resultant powder. I then apply heat to remove the solvent and during the removal of the solvent, I work the mixture so that while it is drying, the ingredients are retained in their state of intimate mixture. I have discovered with black powder that, although its ingredients are such as will tend to crystallize when relieved of the solvent, if worked during drying, I can stop at such a point that it can readily be formed into grains, without return to normal crystalline state. I thus produce, with any method, a black powder, which is practically homogeneous and amorphous, and in granular form.

I also believe myself to be the discoverer of the fact that if said mixture be worked during removal of the solvent, ingredients which would otherwise return to their normal crystalline form upon the removal of the solvent without such working will not return to their normal crystalline form with such working. I believe I am also the discoverer of the fact that such drying and working may be stopped at a point which leaves sufficient moisture in the powder to enable it to be readily grained and yet there will be no tendency of the ingredients to return to normal crystalline form.

I will now describe the apparatus shown in the accompanying drawings in which—

Figure 2:
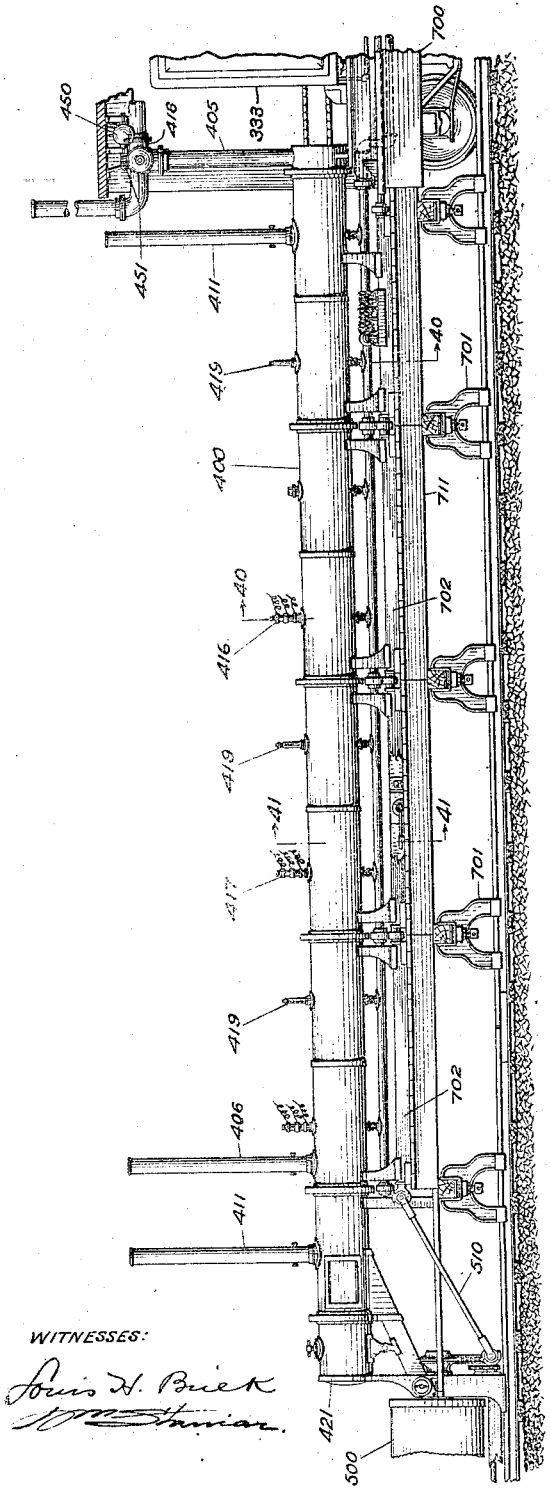
Figure 3:
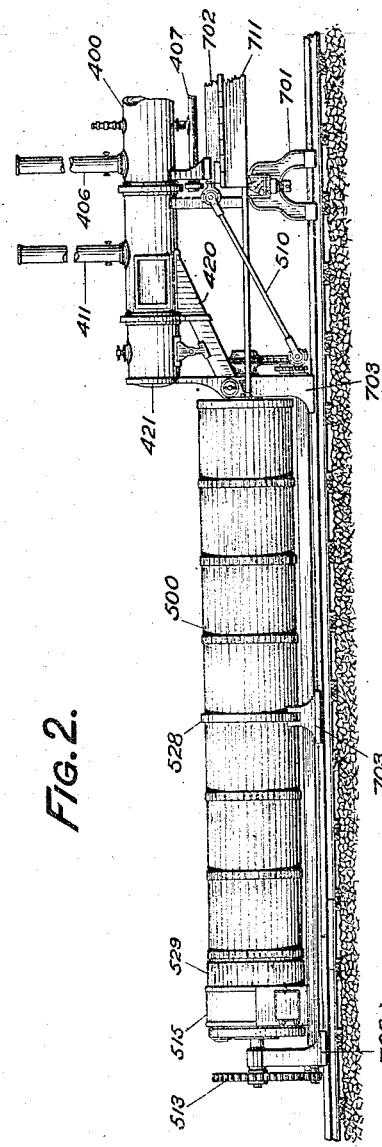
Figure 6:
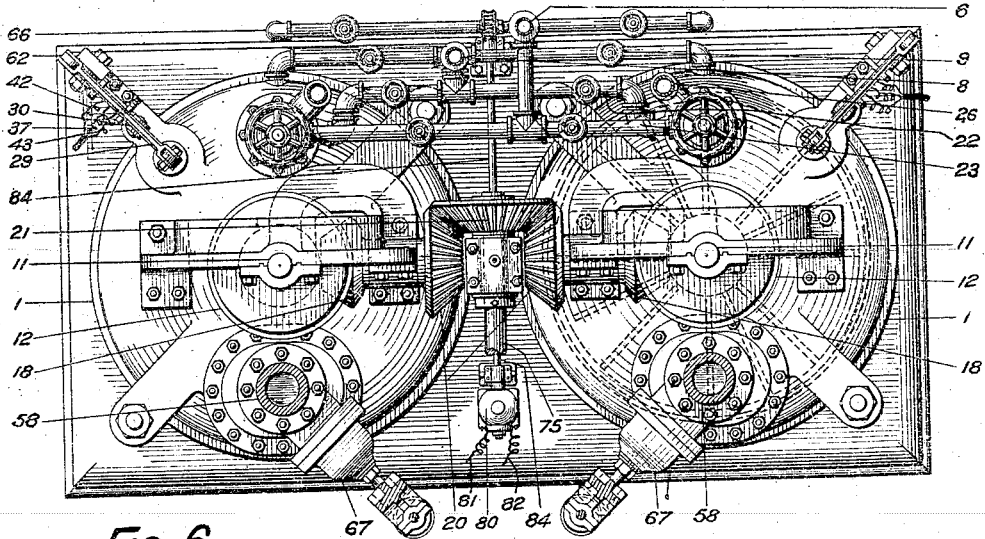
Figure 5:
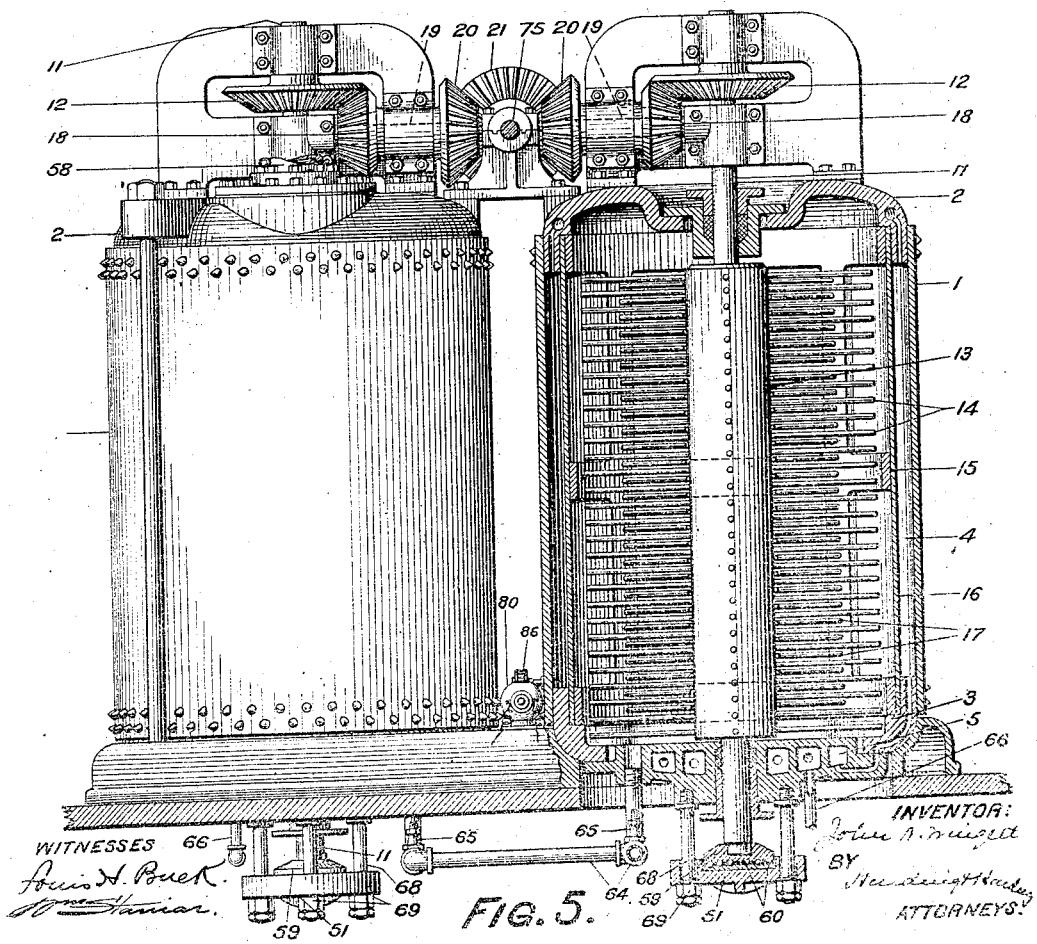
Figure 8:
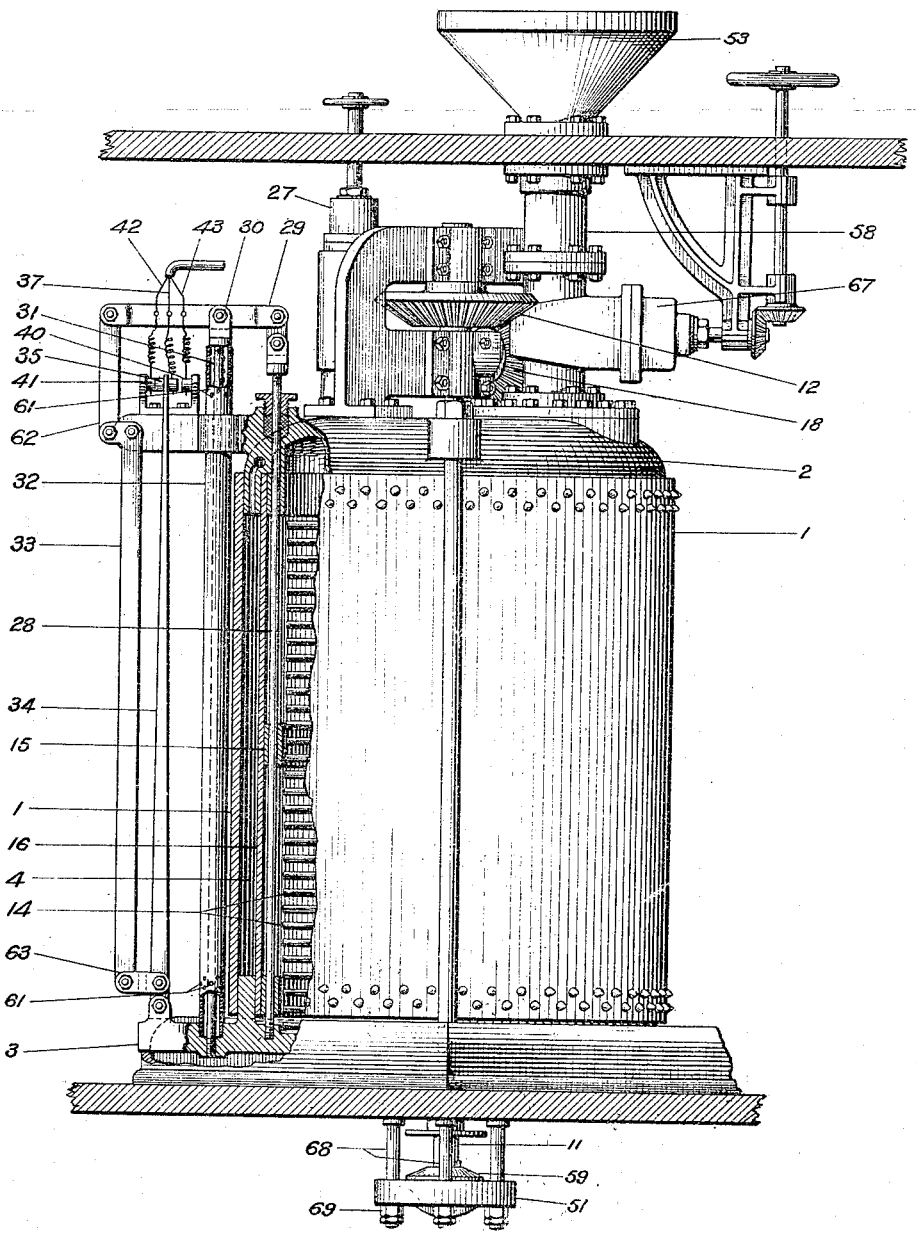
Figure 20:
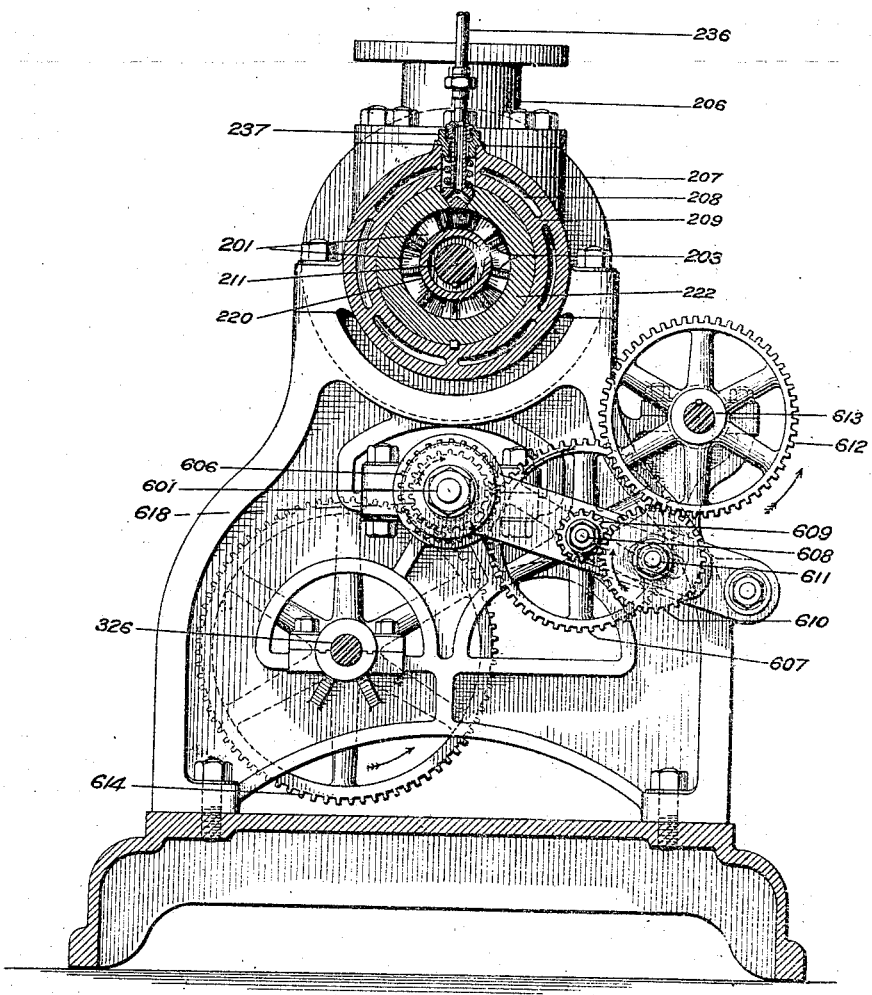
Figure 21:
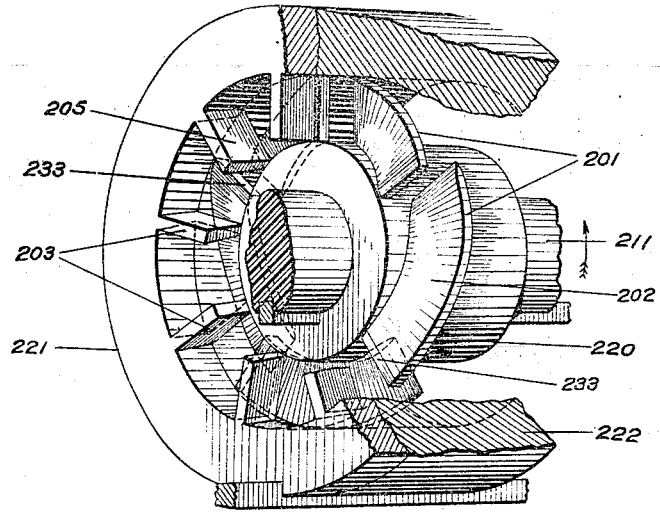
Figure 49:
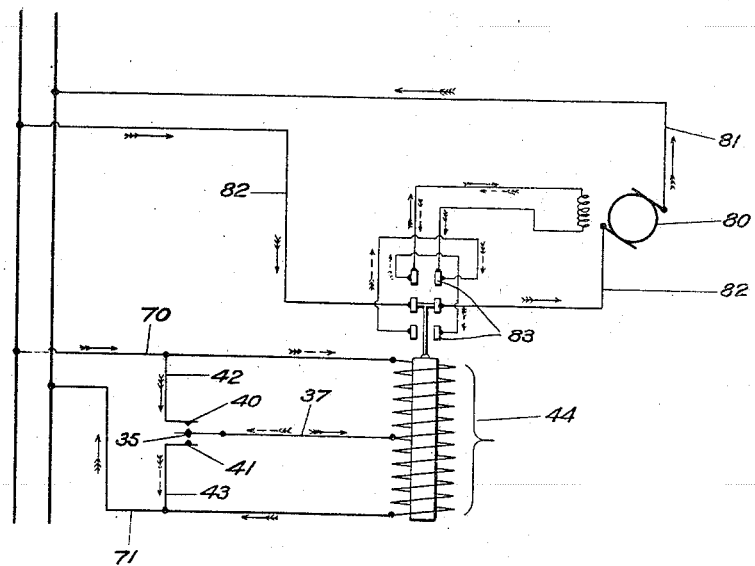
Figure 25:
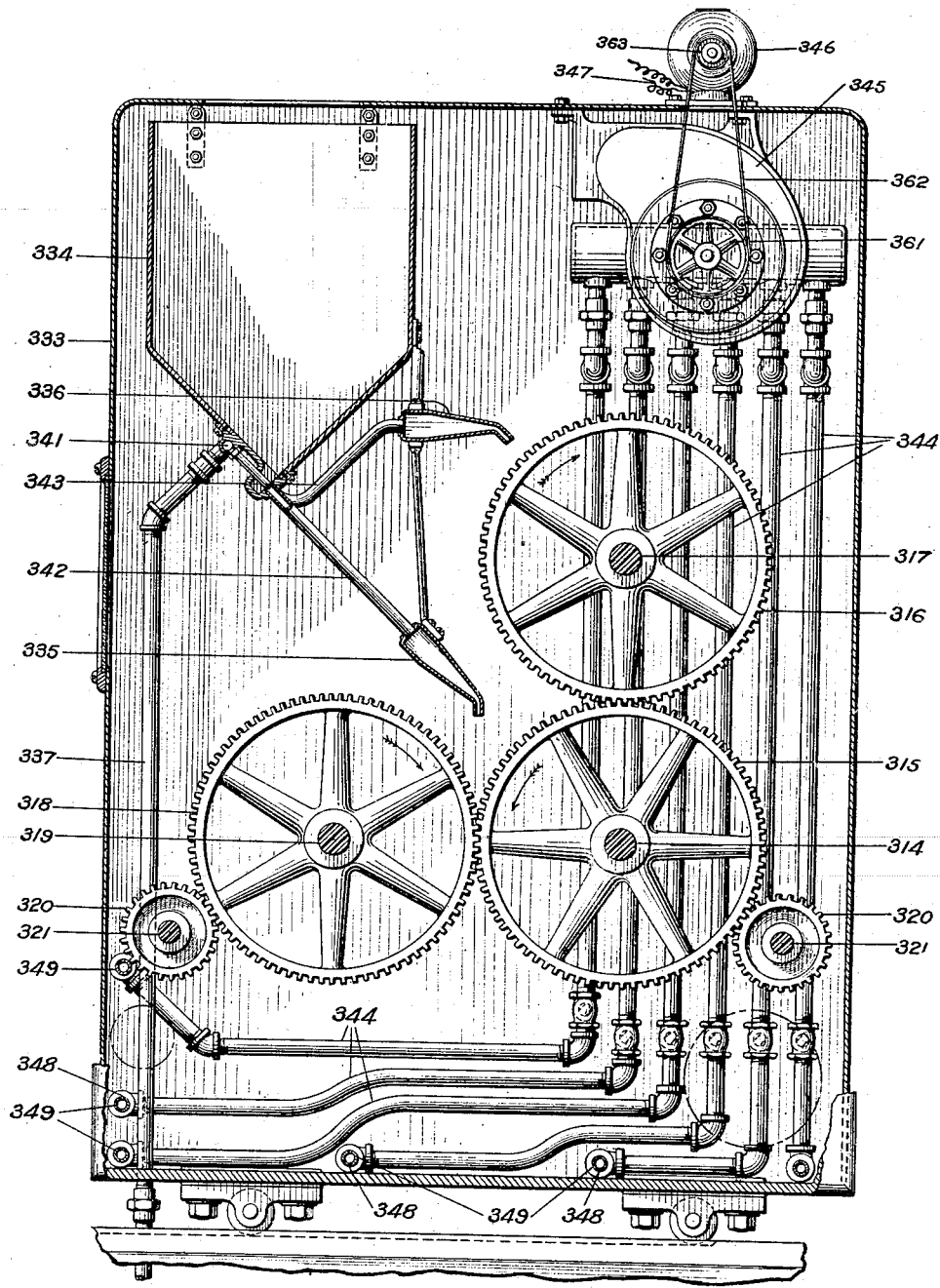
Figure 30:
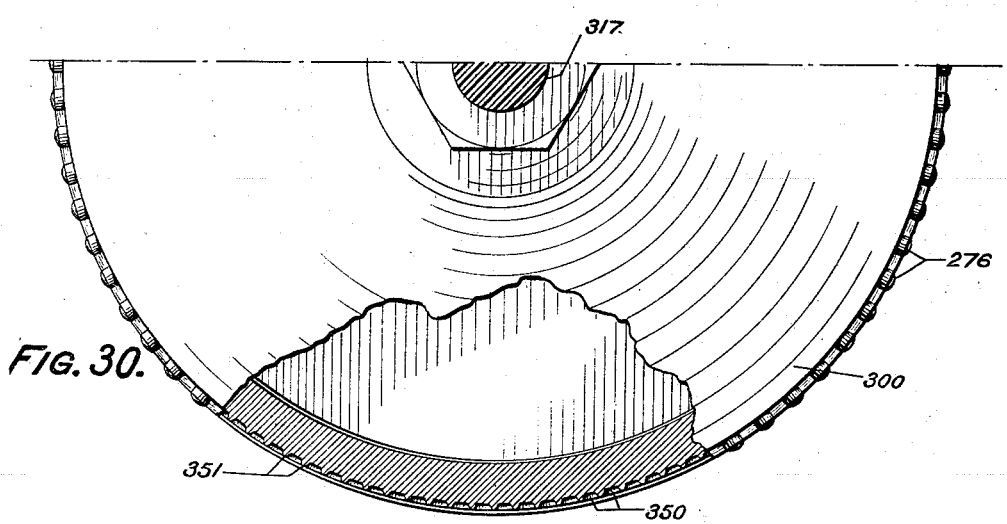
Figure 31:
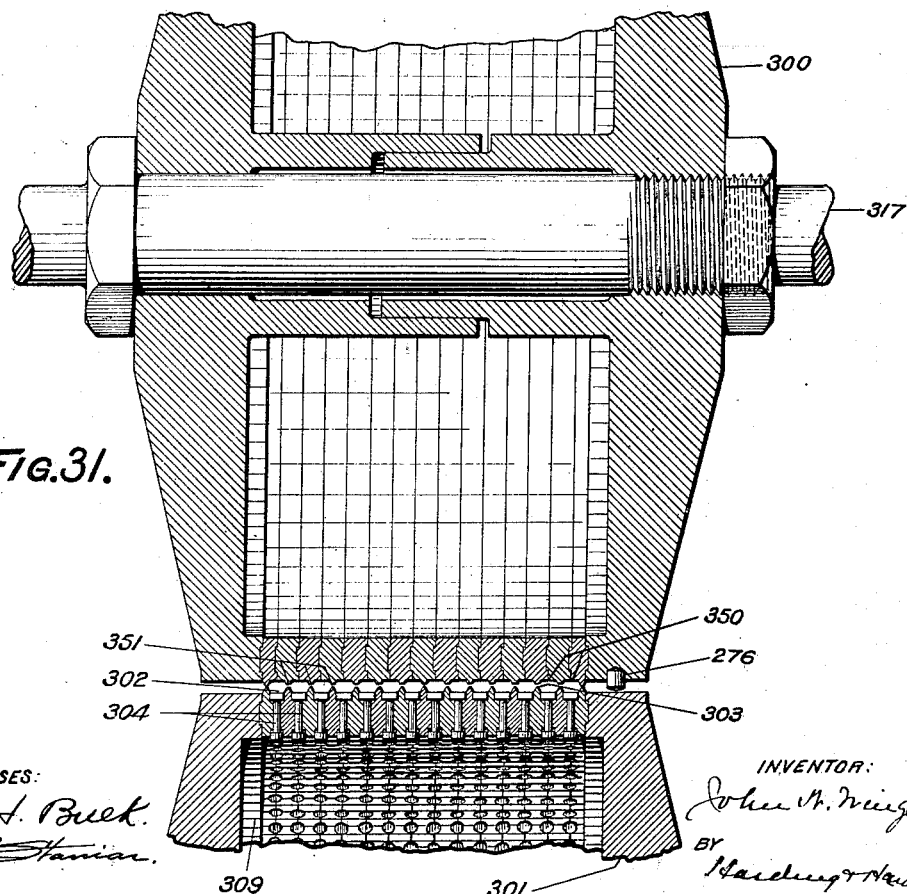
Figure 32:
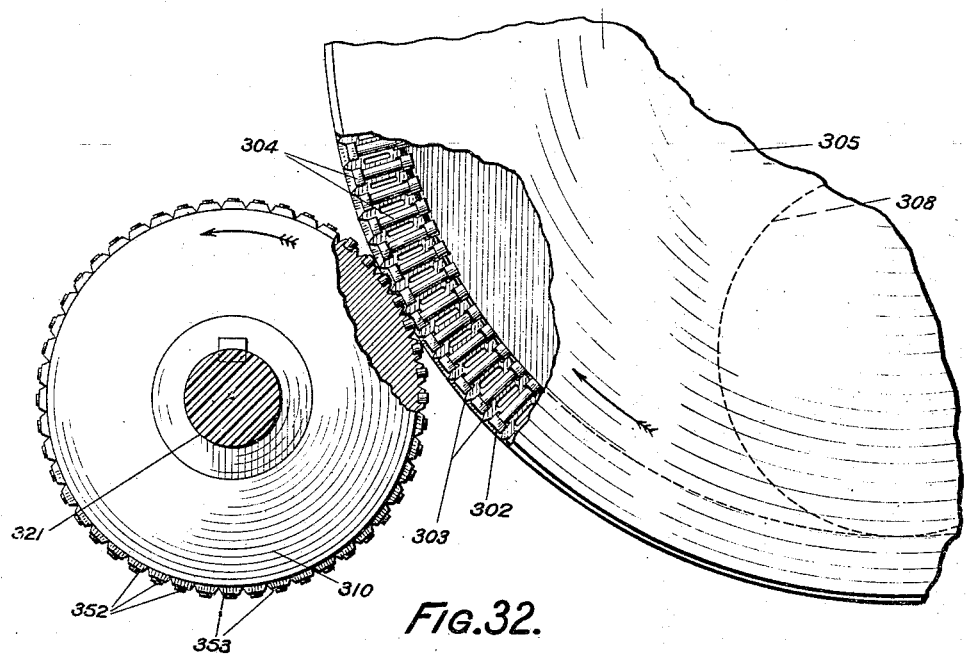
Figure 33:
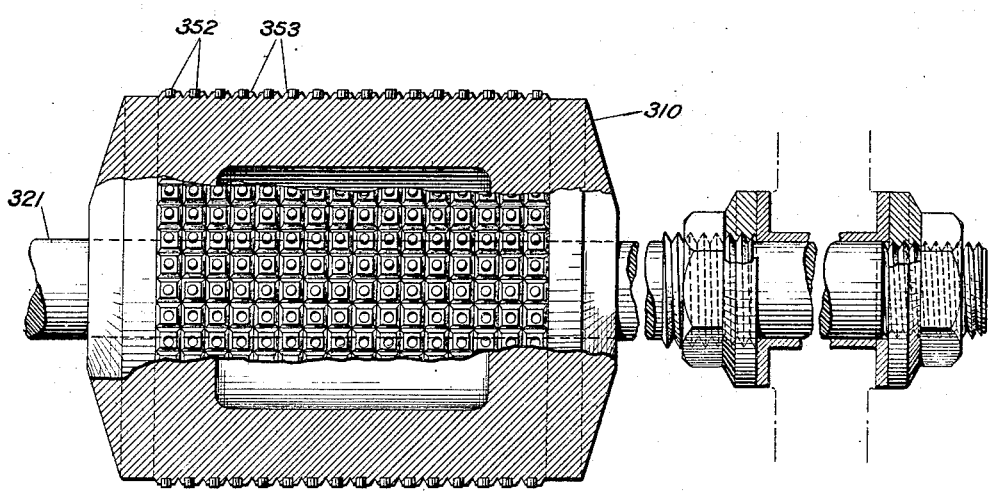
Figure 37:
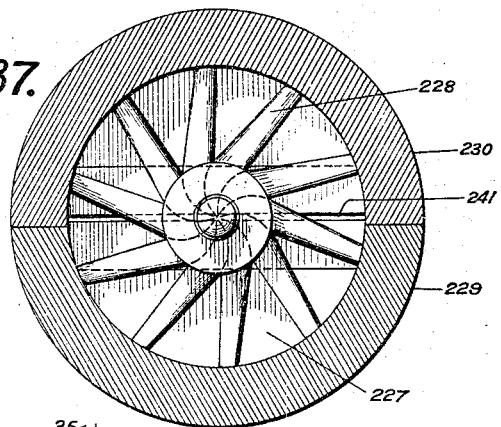
Figure 34:
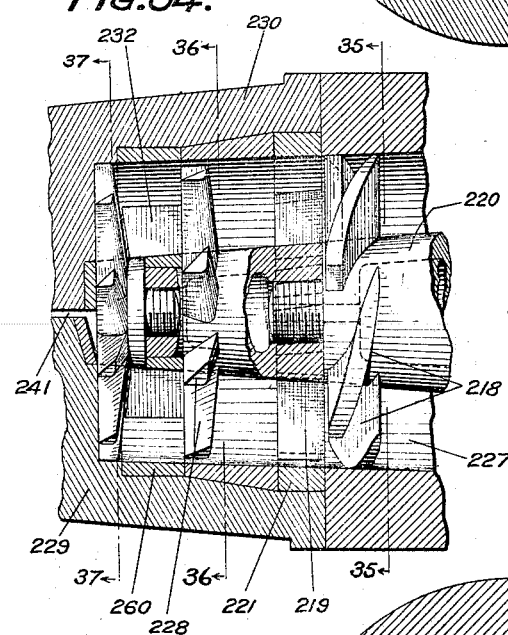
Figure 36:
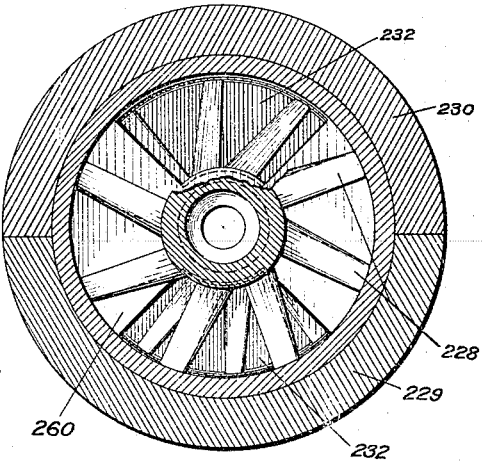
Figure 35:
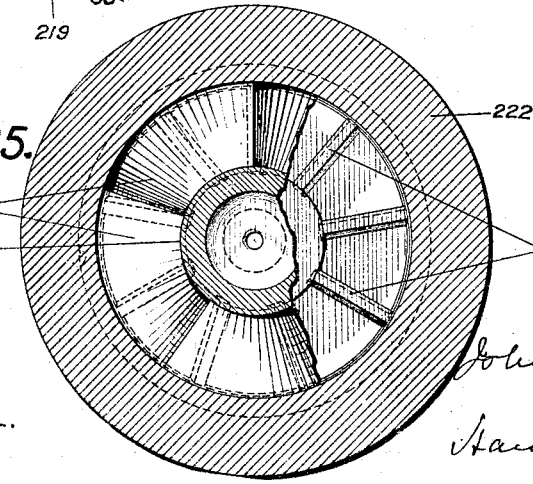
Figure 40:
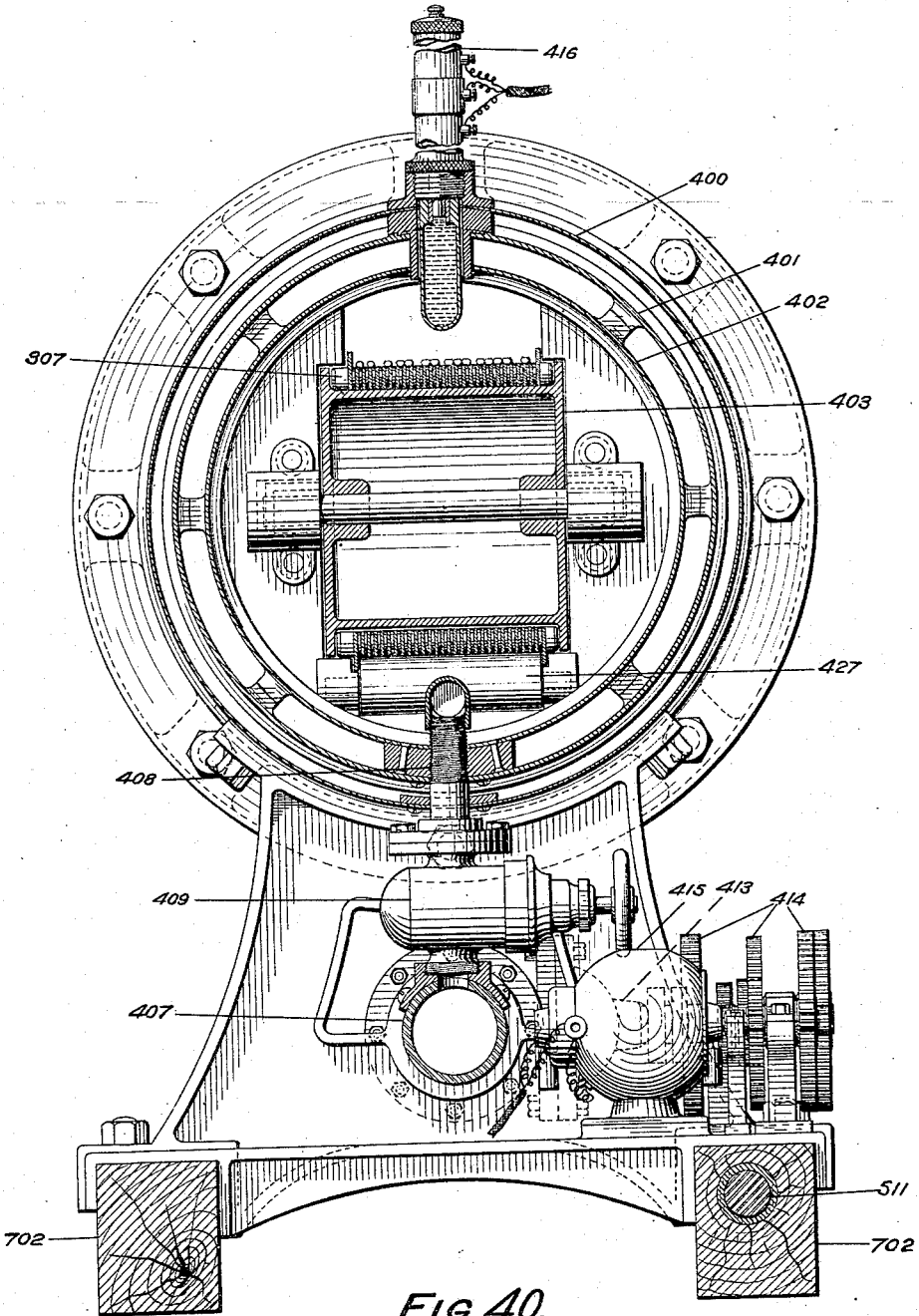
Figure 45:
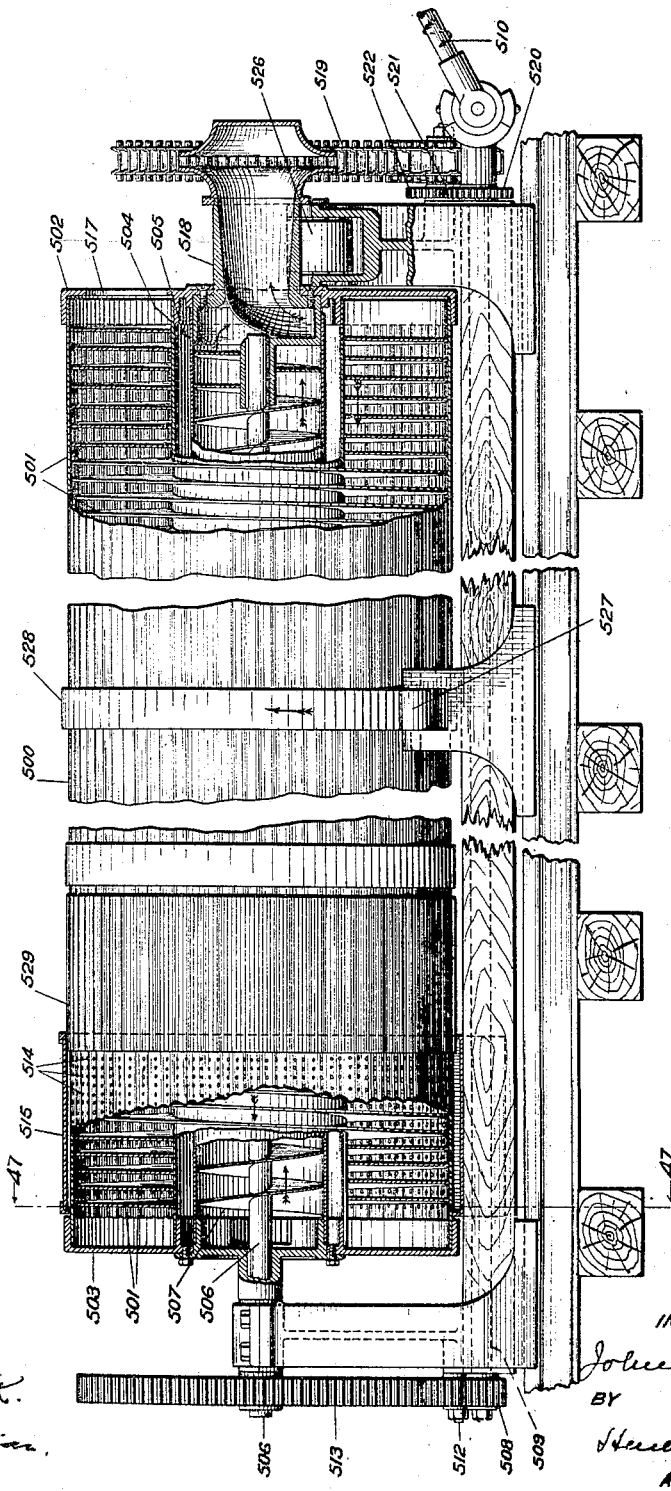
Figure 46:
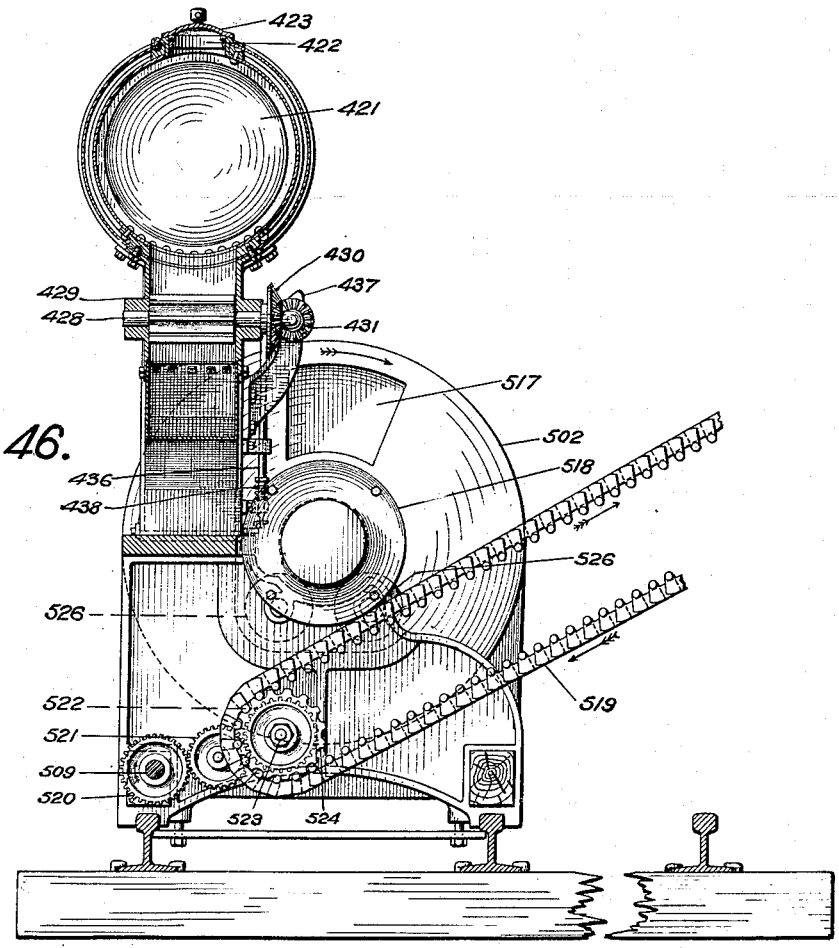
Figure 47:
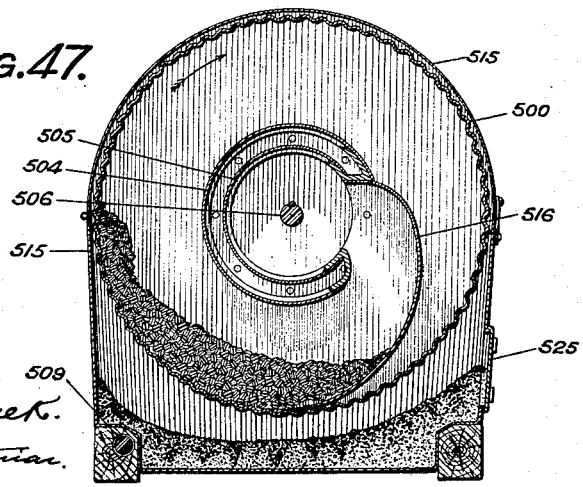
Figure 48:
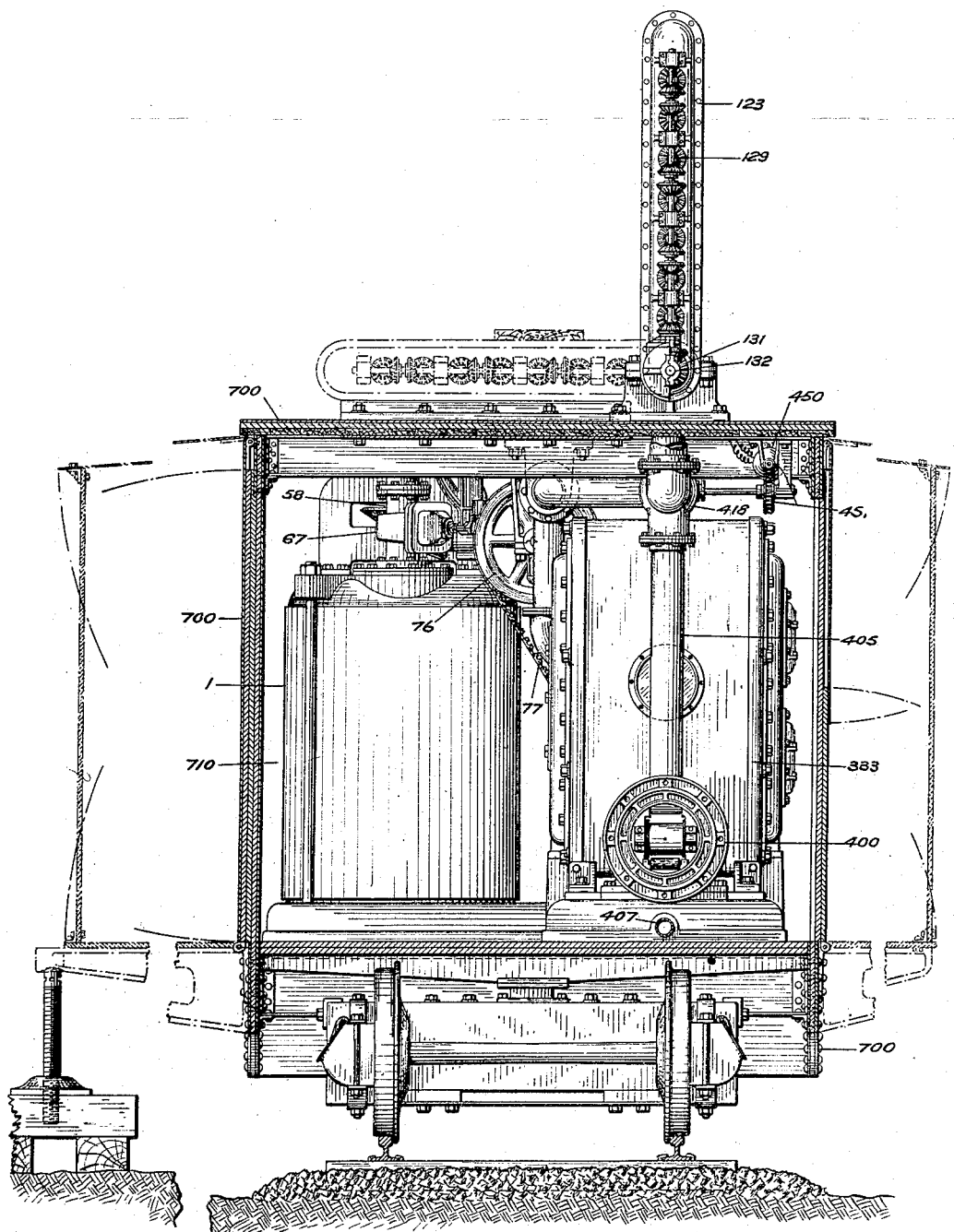

Figure 1 is a general view in elevation of a portion of my improved apparatus for carrying out my improved process of manufacturing explosives when on a car in position for operation. Fig. 2 is a general view in elevation of the drier in position for use, showing its connection with the apparatus preceding it, also one end of glazer. Fig. 3 is a general view in elevation of glazer when in position for use showing its connection with a portion of the drier preceding it. Fig. 4 is a side elevation of the compounder in relation with the means for filling the same and it also shows the compounder in relation to the pump. Fig. 5 is a front elevation of the compounders showing one in section. Fig. 6 is a top plan view of compounders. Fig. 7 is a rear elevation of the compounder showing steam supply and exhaust pipes. Fig. 8 is a compounder partially in section showing detail of thermostat. Fig. 9 is a front elevation of the comminuter pump, showing the cross head guide, the valve and plunger chamber and the baffle pipe partially in section. Fig. 10 is a view on the section line 10—10 of Fig. 9. Fig. 11 is a view on the section line 11—11 of Fig. 10. Fig. 12 is a section on line 12—12 of Fig. 9. Fig. 13 is an enlarged sectional view of the receiving end of the baffle pipe. Fig. 14 is a front elevation of the evaporator showing the driving and receiving end in section, the central portions are broken away. Fig. 15 is an enlarged front elevation of the receiving end of the evaporator, partially in section, some of the same is broken away. Fig. 16 is a sectional plan view on line 16—16 of Fig. 15. Fig. 17 is a section on the line 17—17 of Fig. 15. Fig. 18 is a section on line 18—18 Fig. 15, through the passage 141. Fig. 19 is a front elevation of the condenser being partially in section; also a front elevation of the air pump partially in section. Fig. 20 is a section on the line 20—20 of Fig. 19. Fig. 21 is a perspective view showing the blades and the wings in the condenser. Fig. 22 is a front elevation of the grainer with the casing partially broken away, showing the ratchet arrangement on the bevel gear. Fig. 23 is a section plan of the grainer. Fig. 24 is a sectional elevation on line 24—24 of Fig. 23, showing also the contracted nozzle of the condenser feeding to the grainer rolls. Fig. 25 is a sectional elevation on lines 25—25 of Fig. 23 of the grainer showing the means of driving the grainer rolls and the system of graphite circulation throughout the casing. Fig. 26 is a front elevation of the grainer roll, partially in section showing the plungers. Fig. 27 is a sectional elevation on line 27—27 of Fig. 26. Fig. 28 is a partial sectional view showing plungers forming the base of dies in grainer roll in relation to the plunger roll. Fig. 29 is a perspective view showing a part of the segments which form recesses for the plungers. Fig. 30 is a front elevation of one half of the partial grainer roll, partly in section. Fig. 31 is a section through Fig. 30 longitudinal to the shaft. Fig. 32 is a side elevation of the plunger return roll showing the relation it bears to the plungers in the grainer roll. Fig. 33 is a plan view of the plunger return roll partially in section. Fig. 34 is an enlarged sectional elevation of the feed mechanism in the contracted nozzle of the condenser to the grainer. Fig. 35 is a section on line 35—35 Fig. 34, with portions of the blades 218 broken away. Fig. 36 is a section on line 36—36 Fig. 34. Fig. 37 is a section on line 37—37 Fig. 34. Fig. 38 is a front elevation of the receiving end of the drier partially in section. Fig. 39 is a sectional elevation of the delivery end of the drier showing also the graphite chamber. Fig. 40 is a section through the drier on lines 40—40 of Fig. 2. Fig. 41 is a section partially broken away through the drier on lines 41—41 Fig. 2. Fig. 42 is a plan view of the beams which carry the drier. Fig. 43 is a sectional elevation on lines 43—43 Fig. 42, showing the lever in the locked position. Fig. 44 is a sectional elevation on line 44—44 Fig. 43. Fig. 45 is a front elevation of the glazer partially in section, central portion broken away. Fig. 46 is an end elevation of the glazer showing its relation with the delivery end of the drier. Fig. 47 is a sectional view on line 47—47 Fig. 45. Fig. 48 is a section through the car showing location of apparatus leaving space for drier and glazer for storage during transportation and showing in dotted lines the position of the evaporator during transporting of the mill. Fig. 49 is a diagrammatic lay out of the system of wiring as used in the circuit of the motors governed by the thermostats used throughout this apparatus.

*Compounder.*—1 is a cylinder, having the cover 2 and the bottom 3. The whole cylinder is formed of a very strong material. The base or bottom 3 of the cylinder is made not so strong as the sides and cover, so that, in case of any tendency to rupture, the break will occur at that point and thus allow any material in the cylinder to pass out at the bottom. This cylinder is provided with an internal jacket 4, in connection with a steam jacket 5 in the lower portion or bottom of the cylinder. A steam pipe 6, from a boiler 600 having the pipe connection 66 extends to the jacket 5. Upon this pipe 6 is the controlling valve 7. 8 is an exhaust pipe having a pipe connection 9 with the jacket 4 through the cover 2 of cylinder 1. Upon this pipe 9 are the controlling valves 10. 11 is a vertical shaft passing centrally through the cylinder. This shaft 11 has the base plate 59 keyed to it, which base plate revolves on the ball bearings 60, which are in the races of the base plate 51. This base plate 51 supports the shaft 11 and is regulated by means of the bolts 68 and nuts 69. At the upper end of this vertical shaft is the bevel gear 12. Upon, and revolving with, this vertical shaft and within the cylinder is the drum 13, projecting from which are the arms 14, in sets, spaced apart around the cylinder and extending from top to bottom. Within the cylinder 1 is a skeleton cylinder 15, from the skeleton standard 16 of which project the arms 17 in sets, which enter between the arms 14, these sets of these arms are spaced around the skeleton frame and each set extending from the top to the bottom of the cylinder.

In practice, I use two cylinders each of the construction above described. The bevel gear 12 of each cylinder meshes with the bevel gear 18, upon the shaft 19, which shaft has, at its other end, the bevel gear 20, meshing with the main driving bevel gear 21, so that the shafts 11 of both cylinders are simultaneously revolved. The bevel gear 21 is on the shaft 75. On the other end of shaft 75 (shown in Fig. 1) is the pulley 76 driven by the belt 77 connecting said pulley with pulley 78 keyed to shaft 601 of engine 602, the engine being driven by steam passing from boiler 600 through steam pipe 6 and branch pipe 603.

From the upper portion of the cylinder extends the steam exhaust pipe 22, connected with the exhaust pipe 8. A steam inlet pipe 23, leading from the pipe 6, passes into the top portion of the cylinder. The steam exhaust pipe 22 in each cylinder is controlled by a valve 24 and the steam inlet pipe 23 by a valve 25. 26 is a relief pipe entering the upper portion of cylinder and is controlled by a safety valve 27. Upon the steam inlet pipe 6 is a valve 78 which is controlled by means of a thermostat, so as to maintain any desired temperature within the vessel. I use the thermostat shown in Fig. 8, which consists of the rod 28 within and extending the length of the cylinder 1, and connected to the lever 29, pivoted at 30 to the rod 31, which rod 31 is surrounded by the pipe 32 acting as a non-conductor, by means of the orifices 61 at the top and bottom, allowing an air circulation in the space between rod 31 and pipe 32. The other end of the lever 29 is pivoted to the link 62, which link is connected to the bell crank lever 33, connecting by link 63 to the thermostat indicator 34. This indicator 34 has an electric contact or electrodes 35. The fixed contact points 40 and 41 are connected to the wires 42 and 43 respectively from the poles of the source of current supply, as shown diagrammatically Fig. 49. From the contacts 40 and 41 wires lead to the upper and lower ends of the coil of a double solenoid 44, through wires 70 and 71, so that normally current passes through both coils and maintains the core central. From the contact 35, a wire 37 extends to the central portion of solenoid winding 44. When the contact 35 is moved to contact with the fixed contact 40, the lower coil of solenoid is energized, and the core moved in one direction. When the contact 35 is moved to contact with the fixed contact 41, the upper half of solenoid winding is energized, and the core moved in the other direction. 80 is a motor. 81 is a wire to the motor from one pole of a source of current supply and 82 the wire to motor from the other pole. 83 is a reverse switch on said circuit. This switch is open in the central position of the core and when the core moves in one direction connects the wires in one direction to the motor, and in the other direction of movement of the core connects the wires in the opposite direction. The relief circuit is used because a higher pressure current is necessary, for the motor therein is admissible to use in the thermostat circuit.

The shaft 84 of motor 80 has a worm 85 working in a worm gear 86 on the stem of valve 7. By this arrangement dependent upon the expansion and contraction of rod 28 corresponding to the change from desired temperature, at which the material, to be hereinafter spoken of, is to be treated in the cylinder, the motor is operated and valve regulated, and thus a constant and the desired temperature may be maintained.

The materials to be compounded in this machine, in the first step of making the explosive powder, are mixed together in a moist condition, preferably in a very liquid condition in a vessel (not shown) and are lifted from that vessel by a bucket 45, (shown in Fig. 4) carried by the crane 79 by being suspended on the cable 46 by roller 49, which cable 46 is held in tension by the spring 47, the wire being wound upon the reel 48. When in the position shown in Fig. 4, the roller 49 is not only upon the cable 46, but is also upon the guide way 50 on the horizontal arm of the crane 79. The bucket is pushed forward on this arm until it reaches the mouth 52, when the uncoiling of the cable 46 from the drum 48, due to weight of the bucket, allows the bucket to descend and be filled with the solution containing the ingredients for making the powder. The cable is then wound on roller, lifting the bucket until the bucket reaches the mouth 52, when it is moved rearwardly upon the guide-way 50. At the point shown in the drawing, the lower part of the bucket is over the inlet of the hopper 53, which is maintained closed airtight during the transference of the material by the sleeve 54. The bucket has valve 55 in its bottom controlled by the stem 56, guided by the arms 57. By lifting the stem 56 the valve 55 is opened. The material is then discharged and passes into the interior of the cylinder through the hopper 53 and pipe 58, on which pipe 58 is a controlling gate valve 67. The material in this cylinder is compounded in the revolution of the shaft, the arms or beaters, before described, compounding the same and intimately mixing the material when in a fluid or semi-fluid condition and bringing the component parts into intimate relation with each other. Dependent upon the physical characteristics of the powder desired, the operator adjusts his thermostat, increasing or decreasing the heat and maintaining the temperature at such a point as is necessary, dependent upon the physical characteristics of the desired ultimate mixture. After this compounding in one vessel has proceeded for the necessary length of time, which varies with the character of the powder, the other cylinder is filled or has been filled, and the first mentioned cylinder is discharged. The discharge is obtained as follows: The bottom of the cylinder is connected with the exhaust pipe 64 by opening the corresponding valve 65, and steam is admitted to the top of the cylinder by operating the steam supply valve 24 on pipe 23. The valve 65 controlling the discharge pipe 64 is opened and the material flows out through this discharge pipe 64.

*Comminution and delivery from the compounder to the evaporator.*—As before described, each of the compounders, and there may be any number desired, two being shown, is provided with a discharge pipe controlled by a valve. All of these discharge pipes are connected with the pipe 100. (Shown in Fig. 4.) This pipe 100 passes through, what I term the separator, which is a vessel composed of the top cap 101 and the bottom cap 102, interposed between which caps is the screen 103. This screen 103 is for the purpose of removing or catching any solid particles which are carried suspended on the liquid passing through the pipe 100. The liquid passing through the pipe 100 is practically of the consistency and thickness of a heavy fluid, and this screen filter, the precise construction of which is not essential, is for the purpose of catching any solid particles which may be carried in suspension in this liquid. The solid particles may be carried from the screen 103 of the filter through the pipe 172 by the opening of the valve 173. The pipe 100, after passing through this filter, enters the cylinder of a pump, in line with the conduit 104. This pump comprises, as shown, three pistons 106, connected, at 120 degrees apart, to a crank shaft 105 by the connecting rods 180, and each operating in an independent cylinder 107. Each piston has the rod 181 operating in the chamber 182. There is a separate inlet 108 from the pipe 100 to conduit 104, opposite each of the chambers 182 before mentioned, and the inlets 108 are each covered by a ball valve 109, there is also a separate outlet from each pump cylinder to pipe 104 covered by a valve 190. The valves 109 and 190 are oppositely set. The conduit 104 terminates in the pipe 183. As may be seen from this description, these pistons successively act and in their upward stroke lift the corresponding ball valve 109 closing valve 190 admitting the liquid to the cylinder and in their downward stroke closing valve 109 and opening valve 190 and forcing the material through the conduit 104. With this number of pistons and this arrangement, I have practically a continuous stream passing through conduit 104 and the pipe 183. The crank shaft 105 has upon it the gear pulley 604. Upon this pulley is the gear chain 605 which extends to gear pulley 606 upon shaft 601. This pipe 183 terminates in a nozzle 110, which nozzle is secured to the lower end of the vertical pipe 111. The lower end of this pipe is closed, except the contracted mouth of the nozzle 110. In line with the mouth of this nozzle is a baffle plate 112. This baffle plate is shown in section in Fig. 12. It consists of a plate having a solid outer portion and a perforated central portion. The effect of striking this baffle plate is to break the liquid into the form of spray and the force is such that this spray practically foams, and, by this comminution, the ingredients are brought into intimate relation with each other and forced through the perforations 113.

In this vertical tube 111, I have shown a series of these baffle plates 112, spaced apart, through the length of this tube. The number of these plates is varied, dependent upon the ingredients to be used and the difficulty of comminuting and intimately mixing them. The practical result of this step is to tend to increase the intimacy of the mixture of the explosive ingredients with respect to each other and to hold them into intimate relation and also to prevent any tendency of the ingredients to separate one from the other and to prevent crystallization, or tendency to crystallize, in the passage to that portion of my machine which I call the evaporator where the solvent is removed. In order to prevent the clogging of the mouth of the nozzle 110, I provide the pointed ended rod 114, which extends through the cylinder, and is held in proper alinement by the bearings 115 (shown in detail Fig. 13). This rod is operated by means of a lever 184 (shown in Fig. 4) beyond the upper end of the pipe 111. If there should be any tendency to clog the mouth of the nozzle, the lever is pulled down, moving the rod 114 so that the lower and pointed end enters the mouth of the nozzle and clears it out. The upper end of the pipe 111 connects with that part of my apparatus which I have termed the evaporator. The purpose of this portion of my apparatus is one of the essential features of my invention.

*Evaporator.*—Ordinarily in the manufacture of explosives, after the ingredients of a powder, whether the ingredients are crystalline or not, have been mixed with one another, if a solvent be used in that mixture, the mixture is generally allowed to stand. This tends to cause the ingredients to separate one from another, and if the powder be one in which the ingredients tend to crystallize upon the removal of the solvent, a much greater degree of separation of the ingredients results, due to the tendency of like ingredients to run together and crystallize. In this feature of my apparatus, while the solvent is being removed, I work the mixture so as to maintain the intimate relation of the ingredients which I have previously obtained, thus preventing any separation of the ingredients and any tendency of the ingredients to return to normal crystallization. This I continue up to a point where further drying or removal of the solvent will not cause any separation or any crystallization of the ingredients. I have discovered that by so working I can maintain this intimate relation and prevent the return to normal crystallization and that I can stop this removal of the solvent and working at a point which, although the mixture is still not absolutely dry, but moist enough to densify and cut into grains, still it has reached a point which will prevent any further separation of the ingredients or any return to the normal state of crystallization, and I thus, as will be seen, when I treat of the further steps of my method and apparatus for carrying it out, can produce an explosive in which the ingredients are most intimately mixed, and yet the same is formed into grains.

While, as I have stated, the pipe 111 terminates in the evaporator, it does this through the pipe 116. The pipe 116 terminates in the tube 117, which tube 117 is surrounded by a jacket 118, connected with the steam inlet pipe 119 connected to main steam pipe 603. (Shown in Fig. 1.) The tube 117 connects with the vertical pipe or conduit 120 (shown in detail Figs. 15 and 16). This pipe or conduit 120 is open-ended, but may be closed at the top and bottom by the caps 121. The purpose for making this an open-ended pipe, closed by caps, is that in case there should be any obstruction in the conduit 120, the caps 121 may be removed, and the conduit cleared out. The conduit, as shown, is cored in the frame 122. Supported between this frame 122 and a corresponding frame 123, on the opposite side, are sets of tubes of the desired length and number, as will hereinafter be described. Each set of these tubes comprise an inner pipe 124 and an outer pipe 125, which acts as a jacket to the pipe 124. In each of these inner pipes 124, with the exception of the top one 150, the reason for which exception will hereinafter appear, is a screw conveyer 126, the shaft 172 of which has at its outer end a bevel gear 127, meshing with a bevel gear 128 on the shaft 129, which shaft has the bevel gear 130, meshing with the bevel gear 131 on the shaft 132, which shaft 132 has the bevel gear 133 at its other end, driven by the bevel gear 134, which latter bevel gear 134 is on the shaft 135. On the other end of shaft 135 (shown in Fig. 1) is the bevel gear 604, meshing with bevel gear 605 on the main driving shaft 601; so that these conveyers 126, throughout the whole series of tubes, are simultaneously driven. The conduit 120 connects with the upper of tubes 124, which has a conveyer 126, and, as shown, enters at the right hand end of said tube. The left hand end of said tube terminates in a passage 136 in the frame 123, which passage connects that end of the tube 124 with the left hand end of the next lower tube 124. At the right hand end of the last mentioned tube 124, a passage 137 in the casing 122, connects that end of tube with the right hand end of the next lower tube 124. A passage 138, connects the left hand end of the third tube 124 with the left hand end of the next lower tube 124 and a passage 139 in the frame work 122 connects the right hand end of the fourth tube 124 with the right hand end of the fifth tube 124. A corresponding passage 140 in the frame 123 connects the left hand end of the fifth tube 124 with the left hand end of the sixth tube 124, and a passage 141 in the frame 122 connects the right hand end of the sixth tube with the right hand end of the seventh tube 124. In the passages 136—141 are vibrator plates 175 (shown in Fig. 18) operated by the armature of an electromagnet 176, which magnets are connected in series with the generator 273. This circuit includes the fixed contact 177 on the frame 123 (shown in Fig. 14) and the movable spring contact 178, which spring contact is operated by the cam 179 on the shaft 129, so that in the revolution of the shaft 129, the circuit is made and broken a number of times, thus vibrating the plates 175. The cams 179 and corresponding contacts are located on shaft 129, one controlling the circuit to the vibrations 175 in the frame 122, and the other cam controlling the vibrators in the frame 123. It can thus be seen that the vibrators 175 in each frame are controlled independently. The bevels 128 on the shaft 129 are oppositely placed, so that the conveyers 126 of the successive tubes 124 are oppositely revolved. The upper conveyer carries the material from right to left, the next from left to right, and so on down.

The jacket 118 enters into a passage 142, (shown in detail Figs. 15 and 16) which passage extends to the seventh tube 125, from the top, that is, the next to the bottom tube 125. A passage 143 in the frame 123 connects the left hand end of this tube with the left hand end of the tube 125 above it and a passage 144 in the frame 122 connects the right hand end of the last mentioned tube 125 with the right hand end of tube 125 above it and a passage 145 in the frame 123 connects the left hand end of the said last mentioned tube with the left hand end of the next tube 125 above it. In like manner, the right hand end of that tube 125 is connected by the passage 146 in frame 122 with the right hand end of the tube 125 above it and the left hand end of the last mentioned tube is, by the passage 147 in the frame 123, connected with the left hand end of the upper tube 125. The upper tube 125 connects with the passage 148 leading to an exhaust 157. In the exhaust passage 157 is a thermostat 160 (shown in Figs. 15 and 17) controlling the valve 158 on the steam inlet pipe 119, which is set to regulate the admission of steam based upon the temperature in passage 148 and thus determine the relative temperature of the steam throughout the apparatus. The valve 158 is controlled by motor 159, through the worm gear 185, keyed on shaft of motor 159 meshing with worm wheel 161 on stem of valve 158. The thermostat 160, used, is of ordinary construction. The electrical connections to drive the motor in either direction, as shown in Fig. 49, is the same as that described with respect to corresponding connections for the compounder and reference may be made to the same without again specifically describing the same.

The set of pipes 150 and 149 above the upper pipes 124 and 125, are for the following purpose: Each of the passages, 136, 138, 140 and passages 137, 139 and 141, at the discharge end of the pipes 124, have openings into passages 151 and 152, respectively, formed in the frames 122 and 123. These passages 151 and 152 have outlets into the tube 150 and carry into that tube the vapors of the solvent which has been removed from the mixture. The ends of the tube 150 has secured to them the flanged collars 186 leaving the openings 187 for the entry of the vapors of the solvent into the tube 150. The tube 150 is provided with the drain pipe 169 to carry off the condensed liquid, vapor being prevented from being carried off by the trap 170 in the pipe 171. In the tube 149, which surrounds this tube 150 is carried water, which water enters by the tube 153 from a convenient source of supply to the pipe 163 which pipe terminates in the conduit 188 leading to the passage 154 in the frame 122 leading to one end, the right hand end as shown, of said pipe 149. On the left hand end of the pipe 149, as shown, there is a passage 155 in the frame 123. A conduit 189 extends from this passage 155 downward to the left hand end of lower tube 125. From the right hand end of this tube 125 extends a passage 164 (shown in detail Figs. 15 and 16) having an outlet through conduit 191 and passage 192 to the jacket 165 which surrounds the water supply pipe 163. From the jacket 165 an outlet pipe 166 extends.

Treating from the top, and with respect to the pipes 124 and 125, the purpose is to carry the materials successively through these pipes and during this passage, by heat, to remove the solvent and, moreover, during this passage, by means of the angle of the blades of the conveyer to work the material by, as it were, rubbing it against the tubes 124 in its passage through said tubes, and, moreover, as may be seen, the degree of heat is least at the first treatment and progressively grows greater as the solvent is removed. As the material, when it enters the upper of these tubes 124, is practically a liquid, to produce this result the screw thread has very little angle or pitch. As the material thickens, however, it is necessary that the angle of the blades of the conveyer screw 126, be increased, and progressively increased, so that even at the lowest of these conveyers, which has the pipe 125 surrounding it, and contains steam, the rubbing or working of the material against the surface of the tube 124 is still continued. This change of angle of the blades of the conveyer screw 126, is clearly seen in the drawings. Now at this point, after the material has passed through the lower of these tubes 124, it has reached a condition of dryness which is sufficient to permanently hold the particles of the ingredients contiguous to each other and in which there is no substantial tendency to separate from each other or to crystallize. At this time, however, the mass is in a more or less porous condition, that is to say, it is not as dense as in the finished product, it should be. The next treatment to which I intend to subject this mixture is what I call densifying, or the process by means of which the more or less porous, and not sufficiently dense powder, is compacted and kneaded and brought to the desired dense condition. In order to take this step properly, I desire initially to set, as it were, the material at this stage. I, therefore, in the lower tube 125, have water, which, as it were, sets the mixture during its passage through this tube. During the passage of this material through this tube, it is also, by means of the screw conveyer, given a working or rubbing against the surface of the tube 124. When it has passed the left hand end of this lower tube 124, it enters or falls into the passage 156, which connects to one part of my densifier, or press, which, for the purpose of compactness, and in order to make a machine of this character transportable, as before described, I form at this point.

*Press, kneader or condenser.*—As I have just before described, I have reached that stage in the manufacture of my explosive compound in which the solvent has been substantially removed, while the intimate relation of the ingredients is maintained and the solvent has been removed to a degree where there is no further tendency to separation or crystallization. Further, the compound in that condition has been set. I have also shown that while I have obtained an intimate mixture and the setting of that intimate mixture, the compound is not in as dense a condition as it should be in the finished product and the step I am now going to describe, and the apparatus for carrying it out, is for the purpose of densifying or compacting this compound.

The material from the preceding treatment falls in a passage 156, at the lower end of which is the screw conveyer 200 on the shaft 132. Beyond this conveyer 200, and on the shaft 132, are a series of blades 201 spaced around the shaft in sets. Each set of these blades is formed upon the sleeve 238 which is keyed to the shaft 132. Each of these blades 201 have a long backwardly inclined surface 202 to act as a conveyer and a kneading front face 233. Contiguous to each of these sets of blades 201 are the wings 203, which are fixed to the collar 204, keyed in the casing 234. Surrounding the blades 201 and spacing the collars 204 are the collars 239, keyed to the casing 234. These wings 203 have each the wedge face 205, which coacts with the face 233 of the blades 201. These blades act as conveyers, carrying the material forward until it is rubbed, pressed, kneaded and condensed between faces 233 of the blades and 205 of the wings, which compress, like a wedge, the material between the two faces, gradually forcing it forward between the wings 203. Thus the material is carried forward and during its carrying forward is successively pressed or kneaded. With this step, in this kneading operation, the casing 234 terminates in a conduit or pipe 206, which passes to the second stage of the densifying operation. The conduit is controlled by the gate valve 240, shown in Fig. 1.

The apparatus in the second stage, (shown in Figs. 19 and 20) comprises a main casing 207, which casing contains the jacket 208, provided with strengthening webs 209. Into this jacket water is admitted through pipe 235 from a convenient source of supply. This pipe 235 is connected, as shown in Fig. 1, to water exhaust pipe 166 from the evaporator. The water circulates through the jacket 208 and passes out through exhaust pipe 236. At the receiving end of this casing is a screw conveyer 210 on the shaft 211. This shaft 211 has on it the collar 212. 213 is a bearing plate between which, and the plate 214 of the head 216 of the cylinder 207, are the ball bearings 215. Through the head 216, which closes this end of the casing 207 extends the set screws 217, the inner ends of which set screws bear against the plate 214 and thus adjust the thrust for the shaft 211. Within the casing 207 are a series of conveying and pressing blades 201 of the same construction as described with reference to blades 201 in the casing 234. In Fig. 21 I have shown a detail perspective view showing the action of the blades 201 and coacting parts in casing 207.

Secured to the cylinder, and corresponding to each of these sets of blades are the wings 203 of the same construction as the wings 203 in the casing 234. The cylinder is provided with the desired number of blades and wings, dependent upon the material to be treated and they are arranged in, and connected to, the cylinder respectively in the following manner: Each set of blades 201 is formed upon a sleeve 220, which is keyed upon the shaft 211, while the corresponding sets of wings are secured to the collars 221, which are surrounded by the inner surface of the cylinder 207, and keyed thereto, and which are spaced apart by the collars 222, also keyed to the casing 207. These collars 222 are maintained in their position, at one end, by the head 216, and at the other end, by a cap 223, at the other end of the casing 207. This casing 207 has in it the safety valves 237. The shaft 211 carries upon it the gear wheel 224, meshing with the gear 225 on the shaft 601. In Fig. 24 I have shown the discharge end of the casing 207 through the head 223. The casing near the discharge end, and at a point where the kneading or condensation of the powder has been carried on to a sufficient extent to properly densify it, is tapered for the next step in my method of forming the powder, which is to form this powder, which now has a large part of its solvent removed, into the form of a strip, to cut it into grains. This tapered portion 227 tapers to an extent which will reduce the width of the casing to that of the effective surface of the graining rolls, of which graining rolls I will hereinafter treat. In a part of this tapered portion of the casing, I do not have the kneading wings and my blades are changed, as may be seen, at 228, shown in detail in Figs. 34–37, to conveying blades only, while the wings are changed to a plate 260 provided with top and bottom sector openings 232, so that, while the powder is still being worked in this portion of the casing, the main purpose is, by compression, to reduce the sectional width of the powder in bulk to that of the width of the effective faces of the graining rolls.

At the mouth of contracted portion of the casing are the dies 229 and 230, having an opening 241 therethrough corresponding to the desired width and thickness of the powder strip to be formed, the width being that of the width of the effective surfaces of the graining rolls.

231, shown in Fig. 24, is a vibratory plate, the purpose of which is to prevent the material sticking in passing through the dies 229 and 230. This plate 231 forms a portion of the bottom or operating face of the upper die 230. The upper die has an inset or cut-away portion 226 in which this plate is set. This plate 231 rests upon the springs 281 and is given a movement against the springs by being in line of movement of a rod 282, connected to the armature of an electromagnet 270, which magnet is in the circuit composed of wires 271, 272 in circuit with the generator 273. The wire 271 extends to fixed contact 274. The wire 272 extends to movable contact 275 in line of movement of pins 276 in graining roll 300. As the graining roll revolves, as will hereinafter be described, the circuit to magnet 270 is made and broken, thus vibrating the armature and plate 231. The shaft 277 of the generator 273, shown in Fig. 1, has on it the pulley 278, connected to the pulley 279 on the shaft 601, which is the main shaft of the engine, by the belt 280.

*Grainer.*—The powder which passes out from the dies 229 and 230 through the opening 241, is in the form of a strip which is of width substantially equal to the operating face of the graining wheels. It first passes horizontally between the graining wheels 300 and 301. The surface of the graining wheel 301 is formed of a series of dies 302 of the form of the grains desired to be cut. The cutting edge of these dies is shown at 303 and a detail of these dies is shown in Figs. 26-29. The base of these dies is formed by a plunger 304 movably seated in the face of the wheel 301. When the cutting faces are in their normal cutting position, the inner face of these plungers project within the hollow interior of the wheel 301 and when the plungers are moved outward, by means to be hereinafter described, they can be moved a distance until the inner face of the plunger 304 becomes flush with the edge 309 on the inner surface of the wheel 301. The wheel 300, shown in detail, Figs. 30-31, is provided with dies 350 corresponding to the dies 302 on the wheel 301. The dies on the wheel 300, however, instead of having cutting edges have flat edges 351. Therefore, as the powder strip passes between these two wheels, the dies of the wheel 300 form what may be called an anvil for the cutting faces of the dies on the wheel 301 and they are spaced apart such a distance that the cutting faces of the wheel 301 do not cut the strip completely through. The strip formed into grains and partially cut through in its passage between the wheels 300 and 301, is, in the movement of the wheel 301, turned downward and passes between the wheels 301 and 305. The wheel 305 is provided with cutting dies of the same construction as, and in corresponding positions to, the dies on the wheel 301, and, as a consequence, the cutting edges coact to separate the grains at a point previously partially cut. As the two wheels 301 and 305 separate, the separated grains should fall therefrom to the inclined guide ways 306 leading to the conveyer 307.

In order to make certain that none of the powder grains shall be entrapped or remain in the cutting dies of either wheel 305 or 301, the plunger connection to the base of the dies, before described, is used. The weight of these plungers, together with the powder strip will hold the plungers in their innermost position until the wheels 301 and 305 commence to separate. In the interior of each of the wheels 301 and 305 is the roller 308 (shown in Fig. 26) which rolls on the inner circumference formed by the edge 309 of the wheels 301 and 305. The weight of this plunger roll 308 will always keep it at the bottom of the wheels 301 and 305. When the plungers 304, carried by these wheels, come under these rollers, they are, by their movement against the roller, pushed outward, thereby moving the bottom of the dies and forcing out any grains which may be caught or retained in the die. If this action takes place beyond the hopper, they are forced directly downward, so as to fall upon the conveyer 307. The rollers 310, (shown in detail in Figs. 32-33) driven by means hereinafter described, and having hard rubber tips 352 inserted in their faces 353 made to conform with the contour of the die, will strike the plungers 304 and force it back into the die to its innermost position, where it will be ready to receive and act upon another portion of the powder strip.

Between the rolls 308 and 310, secured to the frame work in a fixed position, are the clearing rods 311, which are in such position that they act upon the face of the die, and scrape off, as it were, any grains which may stick to the bottom of the dies, formed by the plunger 304 which in this position has been pushed out by the plunger roll 308. When the grains fall upon the conveyer, they travel with the conveyer in the direction denoted by the arrow, into the next stage or the drier, hereinafter described.

Wheels 300, 301, 305, and 310 and the conveyer are driven in the following manner: The main shaft 601 has the gear 606 (shown in Figs. 19-20) which meshes with gear 607 on stud shaft 608. On stud shaft 608 is a gear 609 meshing with gear 610 on a stud 611. This gear 610 meshes with gear 612 on shaft 613. On the shaft 613 is the bevel gear 312, Fig. 23, which meshes with the bevel gear 313 on the shaft 314. Upon this shaft 314 is the graining wheel 301. On the shaft 314 is also the gear 315, (shown in Fig. 25) meshing with the gear 316 on shaft 317, upon which is the graining roll 300. The gear wheel 315 also meshes with the gear wheel 318 on the shaft 319, upon which shaft 319 is the graining wheel 305. These gears are all of the same size, so that all of the graining wheels are driven at the same rate of speed. The clearing wheels 310 are driven by means of gears 320, one gear 320 meshing with the gear 318 and the other with the gear 315. These gears are upon shafts, both of which are denoted by 321, said shafts carrying respectively the two clearing wheels 310. The conveyer 307 is provided with lugs or teeth 360. This conveyer chain is driven by the toothed wheel 322, on the shaft 325, coacting with the lugs or teeth 360. The shaft 325 has on it the bevel gear wheel 324 meshing with bevel gear 323 on the shaft 326. On the shaft 326 is the gear 614, shown in Figs. 19–20, meshing with gear 618 on the main shaft 601. In order to provide for the regular feed of powder to the grainer, to prevent the tearing of the powder, I provide the following construction: I have stated that the bevel gear 312 drives the bevel gear 313 on the shaft 314. The bevel gear 313 is not directly connected to the shaft 314, but carries a ratchet 317 (shown in Figs. 22–23). This ratchet extends all around the core of the bevel gear 313 and has equi-spaced teeth. A pawl having the operating end 328 has the tail piece 329 fitting in a socket in an arm 330, which is keyed to the shaft 314. This arm 330 has a tail piece 331 resting against one end of a spring 332, the other end of this spring normally resting against the operating end 328 of the pawl. Under normal conditions, the movement of the ratchet operates the pawl through shaft 314. If for any cause, for instance, too fast feeding of the powder, there should be a tendency for the shaft 314 to revolve faster than it is positively driven, the pawl will be driven forward in the rotation of the shaft, engaging successively by means of the spring 332 the teeth of the ratchet until the speed of feed or speed of drive are again in unison when it will be positively driven.

It is necessary, during the graining, to provide for sprinkling or coating the rolls and the powder grains with graphite, so that the powder grains may be in condition for the drying and glazing operation, and a material, say talc, which will prevent the powder from sticking to the graining rolls. I accomplish this in the following manner: The wheels 300, 301, 305 are supported in a closed case 333, substantially air-tight. In this case is the hopper 334, (shown in Fig. 25) which is filled with a mixture of graphite and talc and has the mouth piece or funnel 335, the mouth of which is in line with the space between the wheels 301 and 305. I also provide a funnel 336 from this hopper 334, feeding over the roller 300. 337 is an air inlet pipe, leading from the cylinder 338. In this is the piston which is similar to piston 370 (shown in Fig. 19). The piston is driven by means of the connecting rod 339, connected to the crank 340 on the shaft 601 so that by the action of this piston air is alternately forced through and drawn back through the pipe 337 into the hopper 334. The pipe 337 terminates in the pipe 341 extending along the outside of the hopper 334 and having connections with the pipes 342, leading to the nozzles 335 and the pipes 343 leading to the nozzle 336, all of the pipes 342 and 343 having an inlet to or an outlet from the hopper 334. The result of this construction is that the air blown in through the pipe 337, into pipe 341, will suck the graphite into and force it through the pipes 342 and 343 and through their respective nozzles 335 and 336. In the interior of the casing 333 is the circulating system of pipes 344. Each of these pipes terminates in the rotary blower 345 driven by motor 346, the pulley 363 on said motor being connected to pulley 361 on blower by the belt 362, the motor having electrical connection 347 with generator 273. Each of these pipes 344 has sections 349 provided with openings or perforations 348.

The operation, as may readily be seen, is to create throughout the whole casing a complete atmosphere of graphite, so that the coating of the grains with graphite is positively insured.

In place of using graphite I can use a high explosive, in which case the grain is coated with a high or sensitive explosive. As an example, the explosive may consist of a mixture of 21 grams of magnesia, 19 grams of permanganate of potash, and 10 grams of barium bromid. But, so far as the apparatus just described is concerned, I intend it to be applied not only to coating explosives with graphite but also to coacting explosives with a high or sensitive explosive.

*Drier.*—The grains falling upon or being delivered to the conveyer 307, are carried by said conveyer into and through the drier. This drier is formed of a cylinder in section and secured together. This cylinder may be of indefinite length dependent upon the character of the powder to be dried. This cylinder is made up of three concentric cylindrical sections, 400, 401 and 402, the conveyer passing through the inner cylindrical section 402, and is supported by carrier wheels 403. At the end of this drier is the wheel 404, about which the conveyer turns, and is supported by carrier wheels 427, thus forming an endless conveyer. At one end of the conveyer is an inlet pipe 405, leading from the exhaust 615 from engine 602. It may extend from a source of live steam supply. This inlet pipe 405 enters the space between the cylindrical sections 401 and 402, near the end opposite the inlet is a steam exhaust 406 extending from the same space. 407 is a pipe adapted to convey heated air. This pipe extends from a jacket located in boiler furnace 616. A pipe 617 extends from this jacket to the compressed air accumulator 619. This air accumulator 619, shown in Fig. 1, contains air under pressure produced by the pumps 620, which are ordinary air pumps driven from shaft 601 by connecting rods 622 (shown Fig. 19). From this pipe 407 extend the branch pipes 408, each of these pipes being controlled by a hand valve 409. Each of these pipes 408 extends into the space of the inner cylindrical section 402, and terminates in a pipe 410, slotted along its lower surface, extending the length of one section, so as to evenly distribute the hot air.

Near each end of the drier is an air outlet 411, each of said outlets having a damper 412. The direction of the travel of hot air is determined by the closure of one or the other of the dampers. Upon the pipe 407 is a main valve 413, operated by the gearing 414 driven by the motor 415. The current to this motor 415 is controlled through a thermostat 416, (shown in Fig. 40), which enters the space in the drier in which the conveyer travels. The construction of this thermostat and its electrical connections are the same as described with respect to the evaporator. The gearing 414 is a reduction gearing, in order to enable the motor to readily control the valve. The space between the cylindrical sections 400 and 401, is packed with magnesia or some other non-heat conducting material. 417 is a thermostat (shown in Fig. 2) which controls the valve 418 on the steam inlet 405 by means of a motor 450, and the worm and worm gear 451. The thermostat and electrical connections being also the same as described with reference to the evaporator. 419 are thermometers which enter the space in the drier, in which the conveyer travels and by which the heat at any point in the drier can readily be determined, and thus may be regulated, if necessary independent of the thermostat. By suitably regulating the hot air and steam the remaining moisture in the powder is removed, the moisture, if any, passing out with the hot air exhaust through the pipe 411. When the conveyer passes around the returning roller 404, the powder grains fall therefrom into the chute 420. Secured to the cylinder 401 is the scraping tool 426 which bears upon the face of the conveyer 307, thereby causing any grains that might remain on the conveyer to fall therefrom.

At the end of the drier is secured the chamber 421, having its end adjacent to the drier securedly closed. This chamber is filled with powdered graphite by means of the opening 422, which opening is closed by the head 423. At the bottom of this chamber 421 is the hopper or chute 424, having the contracted mouth 425, terminating in the chute 420. In the contracted mouth 425 is the shaft 428 having the blades 429 projecting therefrom and in the interior of the mouth. Upon this shaft 428 is a bevel gear 430, meshing with the bevel 431 in the shaft 432. On the other end of shaft 432 is a star wheel 433. An arm 530 on the head 502 of the glazer, in the revolution of the glazer, strikes the points of the star wheel and thus the shaft 432 is revolved. The gears 430 and 431 are so proportional that shaft 428, for a given number of revolutions of the glazer, will move the distance of one blade, thus determining the admission of graphite. The lower end of the chute 420 has a movable lip 435, controlling the discharge from the chute. This lip is pivoted to the wall of the chute. An arm 436 is connected to this lip. The upper end of this arm 436 is held in contact with a cam 437 in the shaft 432 by means of spring 438. This cam is adjusted to move the lip 435 to allow the material to pass out of the chute synchronously with the movement of the blades 429. Thus only the proper quantity of feed is produced and the material fed is properly coated with graphite.

*Glazer.*—The chute 420 connects the drier with the mechanism by which the next operation is carried on, to wit, the glazer. This glazer consists of a cylinder 500. 501 is a screw conveyer projecting from the inner circumference of this cylinder to the outer circumference of the concentric cylinder 504. The cylinder is closed by the heads 502 and 503. Concentric and within the cylinder 500 is the cylinder 505, on the inner circumference of which and on the shaft 506, is the screw conveyer 507. This conveyer is the reverse of the conveyer 501, so that the conveyer 501 will tend to carry material in one direction and the conveyer 507 in an opposite direction. The cylinder 500 and with it the cylinder 504, is revolved in one direction by means of the gear 508 on the shaft 509, which shaft is driven through the universal shaft connection 510, from the shaft 511 (shown in Figs. 1–38–39). On the other end of shaft 511 is bevel gear 625 which meshes with bevel gear 626 on shaft 627. On the other end of shaft 627 is the bevel gear 628 which meshes with a bevel gear 629 on the face of gear 225 on shaft 601. The gear 508 meshes with the idler 512, which meshes with the gear 513 on the shaft 506, which shaft 506 is keyed to the head 502, and 503.

The chute 518 through the head 502, hereinafter described, rests upon the rollers 526, which form the bearing for the head 502. The collar 528, surrounding the cylinder 500, rides on the rollers 527, supporting the cylinder at this point. The cylinder 500, at a portion near the head 503 is perforated, as shown at 514, and this portion of the cylinder is surrounded by a fixed casing 515, forming a chamber. The perforated portion shown at 514 may be entirely closed if desired, by means of the sleeve 529 on the cylinder 500, sliding over the portion into the casing 515. The head 503 is flanged, and in the space formed by these flanges is the guide-way 516, leading to the portion or interior of cylinder 505. The head 502 is provided with an orifice 517, the chute 420 terminating at this orifice 517. Through the head 502, and in line with the conveyer 507, is the chute 518, leading to the conveyer 519. This conveyer is driven by gear 520 on the shaft 509, which gear meshes with the idler 521, which in turn meshes with the gear 522 on the shaft 523, on which shaft is the conveyer chain wheel 524, for the conveyer chain 519.

The operation is as follows: The powder grains, thoroughly coated with graphite, pass from the chute into the cylinder 500, through the head 502, and are by the screw conveyer 501 carried toward the head 503. During this process the constant rolling and rubbing of the grains with the graphite coat thereon, thoroughly polishes them. The interior of the cylinder 500, between conveyer sections, is corrugated or roughened, which adds to this effect. When the material reaches the perforated section of the cylinder 500, any excess of graphite escapes through the perforations 514 into the receptacle or chamber 515, which chamber has the cleaning out door 525. When the grains reach the guide 516, practically all the excess graphite has passed away. The grains are then elevated to the central compartment 505, by the passage through guide-way 516, through which compartment, by means of the conveyer 507, (the same being the reverse of conveyer 501) they are carried from head 503 toward head 502 until they reach the chute 518, when they are delivered through said chute to the conveyer 519. The powder is now in a finished condition.

From the foregoing description of my method and apparatus for producing powder, it will be evident that both my method and apparatus are generically novel. I believe that this process is the first exposition of the production of powder continuously, from the admixture of the ingredients to the production of the finished powder. Heretofore, the production of powder has been intermittent, requiring isolated and detached mechanisms, each of which, while it played its part to the common end, as a whole formed a discontinuous mechanism and an ineffective method for the production of powder and ineffective mechanism for producing the same. In my process, as I have stated before, I have absolute control of the heat conditions under which the first mixture is made. Moreover, I can make this mixture much more intimate than has ever been done before for the reason that this mixture is made in a fluid or semi-fluid condition. Moreover, by the use of heat, and determining this heat, the characteristics of the powder may be varied at will. Further, the powder is not completely dried or its solvent completely removed until the finished product is produced. Moreover, from the commencement of the removal of the solvent from the powder until it is in a condition where it is permanently set with the intimate relations of the ingredients one with the other fixed and the crystalization, or tendency to crystalize, arrested, I continuously work this composition and thus produce an amorphous powder and yet one that is capable of being cut into grains. Moreover, as may be seen in my apparatus, the mechanisms producing the various stages are of such character and being connected to and driven by a source of power which is common to all and supplied with heat from a source which also is common to all, that I can readily assemble the mechanisms for the various stages of my process in conjunction with each other and at any desired point, in exceedingly small compass. Thus I can, as shown in Figs. 1, 2, 3, transport the complete apparatus upon a single car 700, the apparatus, with the exception of the drier and glazer, being placed upon one side of the car, while the drier and glazer are placed in the space 710 upon the opposite side of the car. When the desired point for the use of the mechanism is reached, it is only necessary to lock the brakes upon the car, remove the drier, the sections of which may be separated, and bolted together, from the car and support the same upon the platform 711, such platforms may be placed at various points over the country, on the railroads, at convenient points. These platforms are supported by chairs 701, which may be firmly and fixedly secured to the rails. The glazer is lifted from the car and placed on the track, and secured thereto by chairs 703, in proper relation to the drier. In order to remove the drier from the car on the platform, I have devised a special form of apparatus or truck, which is shown in Figs. 41–44. The drier is permanently secured to the beams 702 of the truck, carried upon the rollers 712. These rollers 712 are supported upon the eccentric shaft 705, operated by the crank 706. By moving this crank in one direction, the rollers may be lifted above the floor so that the beams rest directly upon the floor, either of the car 700 or the platform 711. By turning the crank in the other direction, the truck or frames 702 is supported by the rollers 712 and may readily be rolled from the car to the fixed platform 711. A latch 707 on the frame 702 will hold the crank in the position in which the roller is active. With this arrangement, and the drier secured to the beams 702 of this truck while on the car, the crank is turned so that the beams rest directly on the floor of the car. When the place for use of the apparatus is reached the crank 706 is moved to throw the rollers 712 into operative position, when the truck carrying the drier may be readily rolled from the car 700 to the fixed platform 711. The glazer may be lifted by the ordinary means, such as crane, into position.

I do not intend to limit myself to this arrangement alone. It is shown for the purpose of clearly disclosing the capacity that my novel method and apparatus has to produce a transportable and transferable powder mill, that is, such a powder mill as may be transported to any point and put directly into operation. This is of great advantage, as the transporation of explosives is not only highly dangerous, but exceedingly expensive. The locality for their demand varies considerably and the expense of constructing the powder plants of the old type in each locality is extremely expensive and impossible to multiply to great extent. Moreover, where a powder works may be constructed at any given point at a given time, the demand in that locality may cease, when the powder mill of the old character would become valueless. With my method and apparatus, the apparatus may be shifted with great ease and with small expense from point to point, wherever the manufacture of the powder may be necessary or advisable. As I stated before, this apparatus being transportable on a single car, the expense of transporting the same from one place to another is practically no more than the expense of transporting a single car. It is also to be understood that while I have shown this apparatus as carried upon a car and the capacity thereby of being transported from place to place, so as to make the powder on the ground where it is to be used, it is evident that this method and apparatus lends itself to transportation by means other than a car. Thus, I can transport this apparatus readily and in a small compass upon a boat or ship of any character. By this arrangement, I may, if desired, provide a boat or ship equipped with this apparatus, whereby powder may be made at any point where it is desired to be used. It can even be used by either the army or navy to supply demands for powder during the progress of an engagement.

I will here state an example of the ingredients used in my process and the method of manufacture. I take for instance, nitrate of soda, 73 parts, charcoal, 16 parts, sulfur, 11 parts, water, 122.22 parts. This, after the water has been evaporated in the process, leaves a powder containing 73 parts of niter, 16 parts of charcoal, and 11 parts of sulfur. These materials are placed in a compounder, water being the solvent for the niter, and subjected to a temperature, which, to obtain the full benefit of the process, must be above the melting point of sulfur, that is to say, over 115 degrees centigrade. A good powder can be made with the temperature about 150 degrees centigrade. By the action of the water and the heat, the crystalline substances, sulfur and nitrate of soda, are brought into a fluid condition. The length of time during which the materials are left in the compounder is dependent upon quite a number of conditions. The material, with the compounder shown in the drawings, if treated in the compounder for about an hour, will give the proper compounding effect. This effect is probably a complete distribution of the liquid sulfur in the form of an emulsion throughout the mass of charcoal and dissolved niter. The action of the comminuter is to more fully divide the sulfur and mix it in and more perfectly amalgamate the mixture.

The time required for the material to pass through the evaporator, shown in the drawings, is from five to seven minutes. The temperature of these tubes must be above the boiling point of the niter solution. The temperature is adjusted, preferably, so that the materials issuing from the evaporator will have been reduced to from ten to twelve per cent. of moisture. This is intended only as an example, as the precise heat and duration should be determined in each case, or rather, in each manufacturing, by examining the mixture as it issues from the evaporator, and if it comes out too soft, the thermostat is regulated to give a little higher temperature, and if the mixture is too dry, it is regulated to give a little lower temperature. The temperature in one end of the evaporator should be higher than the other, because, as the solvent is removed from the mixture, the temperature of the boiling point of the solution becomes higher, so that in this evaporator there is a gradation of the temperature, the highest temperature being at the discharge end and the lowest at the end where the material enters. The material, after passing through the evaporator, passes through the cooling tube, through which it passes quite rapidly. This passage through the cooling tube solidifies, or tends to solidify, the sulfur, in both the evaporator and the cooling tube. The working of the material prevents the niter and the sulfur from recrystallizing. After passing through the cooling tube, the material passes into the condenser, through which it also passes quite rapidly. It then passes continuously through the graining apparatus and into the graphite apparatus. As to the details of time of passage through, and quantity of graphite used, they are unnecessary.

The material then, finally, passes to the final drier, where the temperature must be at slightly over 100 degrees centigrade. It is necessary, however, in order that this temperature be maintained, that the air entering the drier should be at a much higher temperature, say, for instance, 150 degrees to 160 degrees centigrade. The cooling effect of the evaporation of the water from the powder causes the temperature of the drier, under these conditions, to be not much over 100 degrees centigrade. The steam in the drier jacket is at atmospheric pressure or very slightly above it. The drying here is done very rapidly, so as to prevent any recrystallization.

Having now fully described my invention, what I claim and desire to protect by Letters Patent is:

1. The step in the method of making explosive powder, which includes mixing the constituents while the normally crystallizable ingredients are in solution, and then subjecting the mixture to the action of heat in a sealed receptacle while maintaining in motion the soluble ingredients which are normally crystalline, thereby to prevent normal crystallization.

2. The step in the method of making explosive powder, which includes agitating the mixed normally crystallizable ingredients in a sealed receptacle while in a fluid condition to prevent crystallization, and subjecting them during such agitation to any predetermined degree of heat whereby to control the physical characteristics of the desired ultimate mixture.

3. The step in the method of making explosive powder, which includes mixing the constituents in a sealed receptacle while the normally crystallizable ingredients are in a fluid condition, and at the same time subjecting the mixture to any predetermined degree of heat whereby to determine the physical characteristics of the desired ultimate mixture, said mixture being maintained in solution during such heating to prevent normal crystallization of the ingredients.

4. The step in the method of making explosive powder which includes mixing the constituents while certain of the ingredients are in solution, subjecting the mixture while in a sealed receptacle to the action of a practically unvarying degree of heat necessary to determine the physical characteristics of the ultimate mixture, maintaining the mixture in a fluid state during such heating by preventing the normal crystallization of the ingredients, and partially evaporating the solvent.

5. The step in the method of making explosive powder which includes mixing the constituents while certain of the ingredients are in solution, subjecting the mixture while in a sealed receptacle to the action of a degree of heat necessary to determine the physical characteristics of the ultimate mixture, maintaining the mixture in a fluid state during such heating by preventing the normal crystallization of the ingredients and partially evaporating the solvent while the mixture is in motion.

6. The step in the method of making explosive powder which includes mixing the constituents while certain of the ingredients are in solution, subjecting the mixture while in a sealed receptacle to the action of a degree of heat necessary to determine the physical characteristics of the ultimate mixture, maintaining the mixture in a fluid state during such heating by preventing the normal crystallization of the ingredients, partially evaporating the solvent, then setting the mixture, and subsequently reducing it to grains.

7. The step in the method of making explosive powder which includes mixing the constituents while certain of the ingredients are in solution, subjecting the mixture while in a sealed receptacle to the action of a degree of heat necessary to determine the physical characteristics of the ultimate mixture, maintaining the mixture in a fluid state during such heating and preventing the normal crystallization of the ingredients, partially evaporating the solvent, then setting the mixture, then kneading it, and subsequently reducing it to granular form.

8. The method of making explosive powder which includes mixing the normally crystalline ingredients in solution in a sealed receptacle and subsequently maintaining them in an agitated condition to prevent return to their normal crystalline condition while subjected successively to evaporating, setting and densifying means.

9. The method of making explosive powder which includes mixing the normally crystalline ingredients in solution in a sealed receptacle and subsequently maintaining them in a constantly violently agitated condition to prevent return to their normal crystalline state while subjected to gradually increasing heat thereby to evaporate a portion of the solvent.

10. The method of making explosive powder which includes mixing the normally crystalline ingredients in solution and maintaining them in a violently agitated condition in a sealed compounder and subsequently in an evaporator to prevent return to their normal crystalline condition.

11. The method of making explosive powder which includes mixing the normally crystalline ingredients in solution and maintaining them in an agitated condition in a sealed compounder and while subsequently subjected to evaporating means to prevent return to their normal crystalline condition then setting and densifying the mixture, and then forming the mixture into grains, and drying the grains.

12. The method of making explosive powder, which includes compounding normally crystalline ingredients in solution in a sealed receptacle, then moving the mixture continuously through the evaporating means and then setting, densifying, graining and drying.

13. The method of making explosive powder, which includes compounding normally crystalline ingredients in solution in a sealed receptacle, subsequently partially evaporating the solvent and setting the mixture, said mixture being kept in agitation continuously through the said successive steps of the method.

14. The method of making explosive powder, which includes compounding normally crystalline ingredients in solution in a sealed receptacle, subsequently partially evaporating the solvent, setting the mixture, and kneading and compressing the same, said mixture being kept in agitation continuously through the successive steps of the method without coming to a state of rest.

15. The method of making explosive powder, which includes compounding normally crystalline ingredients in solution, in a sealed receptacle, subsequently partially evaporating the solvent, setting the mixture, kneading and compressing the same, and then forming the mixture into grains, said mixture being kept in agitation continuously through the successive steps of the method without coming to a state of rest.

16. The method of making explosive powder, which includes componding normally crystalline ingredients in solution, in a sealed receptacle, subsequently partially evaporating the solvent, setting the mixture, kneading and compressing the same, forming the mixture into grains and then drying the grains, said mixture being kept in agitation continuously through the successive steps of the method without coming to a state of rest.

17. The method of making explosive powder, which includes compounding normally crystalline ingredients in solution, in a sealed receptacle, subsequently partially evaporating the solvent, setting the mixture, kneading and compressing the same, forming the mixture into grains, and then drying and glazing the grains, said mixture being kept in agitation continuously through the successive steps of the method without coming to a state of rest.

18. The method of making explosive powder, which includes compounding normally crystalline ingredients in solution, in a sealed receptacle, subsequently partially evaporating the solvent, and kneading and compressing the same, said mixture being kept in agitation continuously through the successive steps of the method without coming to a state of rest.

19. The method of making explosive powder which includes mixing the normally crystalline ingredients in solution and maintaining them in an agitated condition to prevent the return to their normal crystalline state while subjected successively to heat in a sealed compounder and to gradually increasing heat in an evaporator, then kneading the mixture, and then forming it into grains.

20. The method of making explosive powder, which includes compounding normally crystalline ingredients in solution, in a sealed receptacle, removing the mixture from the receptacle, and subsequently partially evaporating the solvent, kneading and compressing the same, and then forming the mixture into grains, said mixture being kept in agitation continuously through the successive steps of the method without coming to a state of rest.

21. The method of making explosive powder which includes compounding normally crystalline ingredients in solution, in a sealed receptacle, removing the mixture from the receptacle, and subsequently partially evaporating the solvent, kneading and compressing the same, forming the mixture into grains and then drying the grains, said mixture being kept in agitation continuously through the successive steps of the method without coming to a state of rest.

22. The method of making explosive powder, which includes compounding normally crystalline ingredients in solution, in a sealed receptacle, removing the mixture from the receptacle, and subsequently partially evaporating the solvent, kneading and compressing the same, forming the mixture into grains, and then drying and glazing the grains, said mixture being kept in agitation continuously through the successive steps of the method without coming to a state of rest.

23. The method of making explosive powder which includes mixing the normally crystalline ingredients in solution and maintaining them in an agitated condition to prevent the return to their normally crystalline state while subjected successively to heat in a sealed compounder, and to gradually increasing heat of an evaporator, then kneading the mixture, then forming it into grains, said mixture being kept in agitation continuously through the successive steps of the method without coming to a state of rest.

24. The method of making explosive powder which includes mixing the normally crystalline ingredients in solution and maintaining them in an agitated condition to prevent return to their normal crystalline state while subjected successively to heat in a sealed compounder and to gradually increasing heat of an evaporator, then kneading and compressing the mixture, then forming it into grains and then drying and glazing the grains.

25. The method of making explosive powder which includes mixing the normally crystalline ingredients in solution and maintaining them in an agitated condition to prevent return to their normal crystalline state while subjected successively to heat in a sealed compounder and to gradually increasing heat of an evaporator, then kneading and compressing the mixture, then forming it into grains and then drying and glazing the grains, said mixture being kept in agitation continuously through the successive steps of the method without coming to a state of rest.

26. The method of making explosive powder which includes mixing the constituents while certain of the ingredients are in solution, subjecting the mixture in a sealed compounder to the action of a degree of heat necessary to determine the physical characteristics of the ultimate mixture, maintaining the mixture in a fluid state during such heating by preventing the normal crystallization of the ingredients, and then separating the mixture.

27. The method of making explosive powder which includes mixing the constituents while certain of the ingredients are in solution, subjecting the mixture to the action of a degree of heat necessary to determine the physical characteristics of the ultimate mixture, maintaining the mixture in a fluid state during such heating by preventing the normal crystallization of the ingredients, and then spraying the mixture so as thereby to secure an intimate mixture of its ingredients.

28. The herein described method of making explosive powder which includes mixing the constituents while the normally crystalline ingredients are in fluid condition, then comminuting the mixture and mixing it in its comminuted condition, while subjected to the action of heat, but maintaining in solution the soluble ingredients which are normally crystalline, thereby to prevent recrystallization, then evaporating the solvent sufficiently to cause the mixture to set during agitation and forming the mixture into grains, and finally rapidly drying the mixture.

29. The herein described method of making explosive powder which includes mixing the constituents while the normally crystalline ingredients are in a fluid condition, then comminuting the mixture and mixing it while in its comminuted condition, and then heating the mixture to evaporate the solvent during agitation so as to cause it to set.

30. The herein described method of making explosive powder which includes mixing the constituents while the normally crystalline ingredients are in a fluid condition, and then comminuting the mixture and mixing it while in its comminuted condition.

31. The method of making explosive powder which includes heating a mixture and maintaining it in a fluid state during such heating and preventing the normal crystallization of the ingredients, then removing the mixture from the compounder and heater and directing it into an evaporating means, the mixture being brought to a state of violent agitation during such movement from the compounder to the evaporator, thereby to prevent the return of the ingredients to their normal crystalline state and to prevent their separation during such movement.

32. The method of making explosive powder which includes mixing the constituents while the normally crystallizable ingredients are in solution, and then subjecting the mixture to the action of a substantially constantly uniform heat in a sealed receptacle while maintaining in motion the soluble ingredients which are normally crystalline, thereby to prevent crystallization.

33. The method of making explosive powder which includes agitating the mixed normally crystallizable ingredients in a sealed receptacle while in a fluid condition, to prevent crystallization and subjecting them during such agitation to a practically unvarying heat of any predetermined degree whereby to control the physical characteristics of the desired ultimate mixture.

34. The method of making explosive powder, which includes mixing the normally crystalline ingredients in solution and maintaining them in a violently agitated condition in a sealed compounder and while subsequently subjected to an evaporating means, to prevent return to their normally crystalline condition, then setting and densifying the mixture, and then forming the mixture into grains.

35. The method of making explosive powder, which includes compounding normally crystalline ingredients in solution in a sealed receptacle, then moving the mixture continuously, and while violently agitated, through evaporating means, and then setting, densifying and graining the mixture.

36. The method of making explosive powder, which includes compounding normally crystalline ingredients in solution in a sealed receptacle, subsequently partially evaporating the solvent while violently agitated and setting the mixture, said mixture progressing continuously through the said successive steps of the method.

37. The method of making explosive powder, which includes compounding normally crystalline ingredients in solution in a sealed receptacle, subsequently partially evaporating the solvent while violently agitated, then setting the mixture and kneading and compressing the same, said mixture being kept in agitation continuously through the successive steps of the method without coming to a state of rest.

38. The method of making explosive powder, which includes compounding normally crystalline ingredients in solution in a sealed receptacle, subsequently partially evaporating the solvent while violently agitated, then setting the mixture, kneading and compressing the same, and then forming the mixture into grains, said mixture being kept in agitation continuously through the successive steps of the method without coming to a state of rest.

39. The method of making explosive powder, which includes compounding normally crystalline ingredients in solution in a sealed receptacle, subsequently partially evaporating the solvent while violently agitated, setting the mixture, kneading and compressing the same, forming the mixture into grains and then drying the grains, said mixture being kept in agitation continuously through the successive steps of the method and without coming to a state of rest.

40. The method of making explosive powder which includes heating a fluid mixture while being violently agitated in a sealed compounder, thereby to prevent the normal crystallization of the ingredients, and then removing the mixture from the compounder and directing it into an evaporating means, the mixture being brought to a state of violent agitation during such movement from the compounder to the evaporator.

41. The step in the method of making explosive powder which includes mixing the constituents while the normally crystallizable ingredients are in solution, and then subjecting the mixture to the action of heat without loss of moisture while maintaining in motion the soluble ingredients which are normally crystalline, thereby to prevent normal crystallization and to maintain the proportions of moisture and other ingredients unvarying.

42. The step in the method of making explosive powder, which includes agitating the mixed normally crystallizable ingredients while in a fluid condition to prevent crystallization and without loss of moisture, and subjecting the ingredients, during such agitation, to any predetermined degree of heat.

43. The step in the method of making explosive powder, which includes agitating the mixed normally crystallizable ingredients while in a fluid condition to prevent normal crystallization, and subjecting them during such agitation to a practically unvarying heat of any predetermined degree without loss of moisture, whereby the proportions of moisture and other ingredients remain unchanged and the physical characteristics of the desired ultimate mixture is controlled.

44. The step in the method of making explosive powder, which includes mixing the constituents while certain of the ingredients are in solution, subjecting the mixture to the action of a practically unvarying degree of heat necessary to determine the physical characteristics of the ultimate mixture, maintaining the mixture in a fluid state during such heating by preventing the normal crystallization of the ingredients and preventing the loss of moisture from the mixture, and then partially evaporating the solvents.

45. The step in the method of making explosive powder, which includes mixing the ingredients while certain of the ingredients are in solution, subjecting the mixture to the action of a degree of heat necessary to determine the physical characteristics of the ultimate mixture, maintaining the mixture in a fluid state during said heating by preventing the normal crystallization of the ingredients and by preventing loss of moisture, whereby the proportions of moisture and other constituents are maintained without variation during the heating of the mixture, then partially evaporating the solvents, then setting the mixture, and subsequently reducing the mixture to grains.

46. The method of making explosive powder, which includes mixing the normally crystalline ingredients in solution in a sealed receptacle to prevent loss of moisture from the mixture, and subsequently maintaining the ingredients in an agitated condition to prevent return to their normal crystalline condition while subject successively to evaporating, setting, and densifying means.

47. The method of making explosive powder, which includes mixing the normally crystalline ingredients in solution in a sealed receptacle whereby loss of moisture from the mixture is prevented, and subsequently maintaining the mixture in a violently agitated condition to prevent return to their normal crystalline state while subjected to gradually increasing heat, thereby to evaporate a portion of the solvent.

48. The method of making explosive powder which includes mixing the normally crystalline ingredients in solution and while subjected to heat without loss of moisture, and subsequently maintaining the ingredients in a constantly violently agitated condition to prevent return to their normal crystalline state while subjected to the gradually increasing heat of an evaporator.

49. The method of making explosive powder, which includes compounding normally crystalline ingredients in solution in a sealed receptacle whereby loss of moisture and consequent variation in the proportions of moisture and other ingredients is prevented, then moving the mixture continuously through an evaporating means, and then setting, densifying, graining and drying the mixture.

In testimony of which invention, I have hereunto set my hand, at Philadelphia, on this 22nd day of March, 1907.

JOHN N. WINGETT.

Witnesses:
M. M. HAMILTON,
A. M. URIAN.

Copies of this patent may be obtained for five cents each, by addressing the "Commissioner of Patents, Washington, D. C."